United States Patent
Kim et al.

(10) Patent No.: US 11,622,360 B2
(45) Date of Patent: *Apr. 4, 2023

(54) TERMINAL AND COMMUNICATION METHOD TO PROVIDE COMMUNICATION SERVICES

(71) Applicant: Samsung Electronics Co., Ltd., Suwon-si (KR)

(72) Inventors: Sangbum Kim, Suwon-si (KR); Soenghun Kim, Suwon-si (KR); Jaehyuk Jang, Suwon-si (KR); Gert-Jan Van Lieshout, Apeldoorn (NL); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,379

(22) Filed: Sep. 13, 2021

(65) Prior Publication Data

US 2021/0410159 A1    Dec. 30, 2021

Related U.S. Application Data

(63) Continuation of application No. 16/717,129, filed on Dec. 17, 2019, now Pat. No. 11,122,585, which is a
(Continued)

(51) Int. Cl.
*H04W 72/12* (2023.01)
*H04L 1/1867* (2023.01)
(Continued)

(52) U.S. Cl.
CPC ....... *H04W 72/1205* (2013.01); *H04L 1/1887* (2013.01); *H04W 72/1284* (2013.01);
(Continued)

(58) Field of Classification Search
CPC .. H04W 72/042; H04W 24/10; H04L 1/1887; H04L 1/1692
See application file for complete search history.

(56) References Cited

U.S. PATENT DOCUMENTS

| 9,444,586 B2 | 9/2016 | Vajapeyam et al. |
| 10,075,871 B2 | 9/2018 | Chen |

(Continued)

FOREIGN PATENT DOCUMENTS

| CN | 102595599 A | 7/2012 |
| CN | 103687029 A | 3/2014 |

(Continued)

OTHER PUBLICATIONS

Samsung, Skipping uplink transmission with No. data to transmit, R2-153332, 3GPP TSG RAN WG2 Meeting #91, Aug. 14, 2015.
(Continued)

*Primary Examiner* — Shukri Taha
(74) *Attorney, Agent, or Firm* — Jefferson IP Law, LLP

(57) ABSTRACT

A communication method and a terminal and a base station adapted to the method are provided. The communication method of a terminal includes: receiving a message containing information regarding a semi-persistent scheduling (SRS) configuration from a base station; determining whether a sub-frame configured with a non-adaptive re-transmission is identical to a sub-frame configured with an uplink grant according to the SPS configuration; and when: a sub-frame configured with a non-adaptive re-transmission is identical to a sub-frame configured with an uplink grant according to the SPS configuration; and the terminal does not have data to be first transmitted via the sub-frame configured with an uplink grant according to the SPS configuration, performing the non-adaptive re-transmission.

16 Claims, 21 Drawing Sheets

Related U.S. Application Data continuation of application No. 15/276,158, filed on Sep. 26, 2016, now Pat. No. 10,542,554.

(60) Provisional application No. 62/232,878, filed on Sep. 25, 2015.

(51) Int. Cl.
| | |
|---|---|
| *H04W 72/04* | (2023.01) |
| *H04W 24/10* | (2009.01) |
| *H04L 1/1607* | (2023.01) |
| *H04L 1/1812* | (2023.01) |
| *H04W 84/04* | (2009.01) |

(52) U.S. Cl.
CPC ....... *H04W 72/1289* (2013.01); *H04L 1/1692* (2013.01); *H04L 1/1812* (2013.01); *H04W 24/10* (2013.01); *H04W 72/04* (2013.01); *H04W 84/042* (2013.01)

(56) References Cited

U.S. PATENT DOCUMENTS

| | | |
|---|---|---|
| 2010/0035162 A1 | 2/2010 | Chiga et al. |
| 2011/0107169 A1 | 5/2011 | Lohr et al. |
| 2011/0205991 A1 | 8/2011 | Kim et al. |
| 2012/0069805 A1 | 3/2012 | Feuersanger et al. |
| 2013/0016686 A1 | 1/2013 | Li et al. |
| 2013/0235808 A1 | 9/2013 | Earnshaw et al. |
| 2013/0308610 A1 | 11/2013 | Bergstrom et al. |
| 2015/0124605 A1 | 5/2015 | Gholmieh et al. |
| 2015/0181571 A1 | 6/2015 | Park et al. |
| 2015/0312935 A1 | 10/2015 | Lohr et al. |
| 2016/0095104 A1 | 3/2016 | Chen et al. |
| 2016/0095105 A1 | 3/2016 | Chen et al. |
| 2017/0279563 A1 | 9/2017 | Seo et al. |
| 2018/0091269 A1 | 3/2018 | Ratilainen et al. |
| 2018/0199225 A1 | 7/2018 | Kim et al. |
| 2018/0242367 A1* | 8/2018 | Kim .................. H04W 74/0833 |
| 2018/0262945 A1 | 9/2018 | Yi et al. |
| 2018/0295644 A1 | 10/2018 | Yi et al. |

FOREIGN PATENT DOCUMENTS

| | | |
|---|---|---|
| CN | 103873212 A | 6/2014 |
| CN | 104640223 A | 5/2015 |
| EP | 3 328 119 A1 | 5/2018 |
| WO | 2013/169173 A1 | 11/2013 |
| WO | 2015/054275 A1 | 4/2015 |

OTHER PUBLICATIONS

Samsung, Skipping uplink transmission with no data to transmit, R2-153333, 3GPP TSG RAN WG2 Meeting #91, Aug. 14, 2015.
KDDI, Considerations on latency reduction solutions based on pre-grant procedure for LTE, R2-153823, 3GPP TSG RAN WG2 Meeting #91, Aug. 15, 2015.
Ericsson, L2 enhancements to reduce latency, R2-153490, 3GPP TSG RAN WG2 Meeting #91, Aug. 14, 2015.
Samsung: "Skipping uplink transmission with no data to transmit",3GPP Draft; R2-153332; Skip Uplink TX, 3rd Generation Partnership Project (3GPP), Mobile Competence Centre ; 650, Route Des Lucioles ; 06921 Sophia-Antipolis Cedex ; France, vol. RAN WG2, No. Beijing, China; Aug. 23, 2015, XP051004073, Retrieved from the Internet:URL:http://www. 3gpp.org/ftp/Meetings_3GPP_SYNC/RAN2/Docs/ Aug. 23, 2015.
Samsung: "Skipping uplink transmission with no data to transmit",3GPP DRAFT; 36321_CRYYYY_(REL-13)_R2-153333 Skip Uplink, 3rd Generation Partnership Project (3GPP), Mobile Competence Centre ; 650, Route Des Lucioles ; F-06921 Sophia-Antipolis ; France, vol. RAN WG2, No. Beijing, China; Aug. 14, 2015, XP050992482, Retrieved from the Internet:URL:http://www.3gpp.org/ftp/tsg_ran/WG2_RL2/TSGR2_91/Docs/; Aug. 14, 2015.
Samsung: "Skipping uplink transmission with no data to transmit", 3GPP Draft; 36331 CRYYYY (REL-13) R2-153334 Skip Uplink, 3rd Generation Partnership Project (3GPP), Mobile Competence Centre ; 650, Route Des Lucioles : F-06921 Sophia-Antipolis Cedex ; France, vol. RAN WG2, No. Beijing, China; Aug. 24, 2015-Aug. 28, 2015 Aug. 23, 2015 (Aug. 23, 2015), XP051003843, Retrieved from the Internet: URL: http://www.3gpp.org/ftp/Meetings_3GPP_SYNC/RAN2/Docs/; Aug. 23, 2015.
Extended European Search Report dated Aug. 9, 2018, issued in a counterpart European Application No. 16849068.8-1219/3338500.
Chinese Office Action dated Aug. 4, 2020, issued in Chinese Application No. 201680055998.2.
Japanese Patent Application dated Jul. 6, 2020 , issued in Japanese Application No. 2018-515830.

* cited by examiner

TERMINAL AND COMMUNICATION METHOD TO PROVIDE COMMUNICATION SERVICES

CROSS-REFERENCE TO RELATED APPLICATION(S)

This application is a continuation application of prior application Ser. No. 16/717,129, filed on Dec. 17, 2019, which has issued as U.S. Pat. No. 11,122,585 on Sep. 14, 2021, which is a continuation application of prior application Ser. No. 15/276,158, filed on Sep. 26, 2016, which has issued as U.S. Pat. No. 10,542,554, on Jan. 21, 2020, and was based on and claimed priority under 35 U.S.C. § 119(e) of a U.S. Provisional application No. 62/232,878, filed on Sep. 25, 2015, in the U.S. Patent and Trademark Office, the disclosure of each of which is hereby incorporated by reference herein in its entirety.

BACKGROUND

1. Field of the Invention

The present invention relates to a terminal and a communication method of the terminal.

2. Description of Related Art

Mobile communication systems have been developed to provide a communication service to users while they are moving. With the rapid development of technology, mobile communication systems have been developed to provide data communication services at a high speed as well as voice communication.

In recent years, a Long Term Evolution (LTE) system that has been developed as one of the next generation mobile communication systems is in process of standardization by the 3rd Generation Partnership Project (3GPP). The LTE system refers to a technology that implements high speed packet-based communication with a transmission rate of up to about 100 Mbps higher than the data transmission rate which has been currently used, for the commercialization around 2010. The standardization of the LTE system has almost been completed.

SUMMARY

The present invention has been made to address the above problems and disadvantages, and to provide at least the advantages described below.

The present invention provides a method of enabling UE to operate in such a way that the UE is allocated resources but does not perform the transmission since it does have data to be transmitted, thereby using the pre-allocation with efficiency.

The present invention provides a method of processing MDT measurement information polluted by IDC interference during the MDT measurement.

The present invention provides a method and apparatus for providing the dual connectivity in a wireless communication system.

The present invention provides a method and apparatus for providing the dual connectivity, using different radio access technologies (RATs), in a wireless communication system.

In accordance with an aspect of the present invention, a communication method of a terminal is provided. The communication method includes: receiving a message containing information regarding a semi-persistent scheduling (SRS) configuration from a base station; determining whether a sub-frame configured with a non-adaptive re-transmission is identical to a sub-frame configured with an uplink grant according to the SPS configuration; and when: a sub-frame configured with a non-adaptive re-transmission is identical to a sub-frame configured with an uplink grant according to the SPS configuration; and the terminal does not have data to be first transmitted via the sub-frame configured with an uplink grant according to the SPS configuration, performing the non-adaptive re-transmission.

Preferably, when a sub-frame configured with a non-adaptive re-transmission is identical to a sub-frame configured with an uplink grant according to the SPS configuration and the terminal has data to be first transmitted via the sub-frame configured with an uplink grant according to the SPS configuration, the method further includes: performing the first transmission.

Preferably, the message includes a radio resource control (RRC) message.

Preferably, the message includes: information instructing to perform the uplink transmission via a sub-frame which is configured with an uplink grant according to the SPS configuration and has data to be transmitted.

In accordance with another aspect of the present invention, a terminal is provided. The terminal includes a transceiver for performing the transmission/reception of signals; and a controller. The controller receives a message containing information regarding a semi-persistent scheduling (SRS) configuration from a base station. The controller determines whether a sub-frame configured with a non-adaptive re-transmission is identical to a sub-frame configured with an uplink grant according to the SPS configuration. The controller performs the non-adaptive re-transmission, when: a sub-frame configured with a non-adaptive re-transmission is identical to a sub-frame configured with an uplink grant according to the SPS configuration; and the terminal does not have data to be first transmitted via the sub-frame configured with an uplink grant according to the SPS configuration.

In accordance with another aspect of the present invention, a communication method of a base station is provided. The method includes: transmitting a message containing information regarding a semi-persistent scheduling (SRS) configuration to a terminal; and when: a sub-frame configured with a non-adaptive re-transmission is identical to a sub-frame configured with an uplink grant according to the SPS configuration; and the terminal does not have data to be first transmitted via the sub-frame configured with an uplink grant according to the SPS configuration, receiving non-adaptive re-transmission data from the terminal.

Preferably, when: a sub-frame configured with a non-adaptive re-transmission is identical to a sub-frame configured with an uplink grant according to the SPS configuration; and the terminal has data to be first transmitted via the sub-frame configured with an uplink grant according to the SPS configuration, the method further includes receiving first transmission data from the terminal.

In accordance with another aspect of the present invention, a base station is provided. The base station includes: a transceiver for performing the transmission/reception of signals; and a controller. The controller transmits a message containing information regarding a semi-persistent scheduling (SRS) configuration to a terminal. The controller receives non-adaptive re-transmission data from the terminal, when: a sub-frame configured with a non-adaptive re-transmission is identical to a sub-frame configured with an uplink grant according to the SPS configuration; and the terminal does not have data to be first transmitted via the sub-frame configured with an uplink grant according to the SPS configuration.

The preceding summary is merely intended to provide a few aspects of the present invention, and is not intended to restrict in any way the scope of the claimed invention. It should be understood that the features and advantages of the present invention are not limited to those in the foregoing description, and the other features and advantages not described above will become more apparent from the following description.

BRIEF DESCRIPTION OF THE DRAWINGS

The above and other aspects, features and advantages of the invention will be more apparent from the following detailed description, taken in conjunction with the accompanying drawings, in which.

DETAILED DESCRIPTION OF EMBODIMENTS OF THE INVENTION

Figure 1:
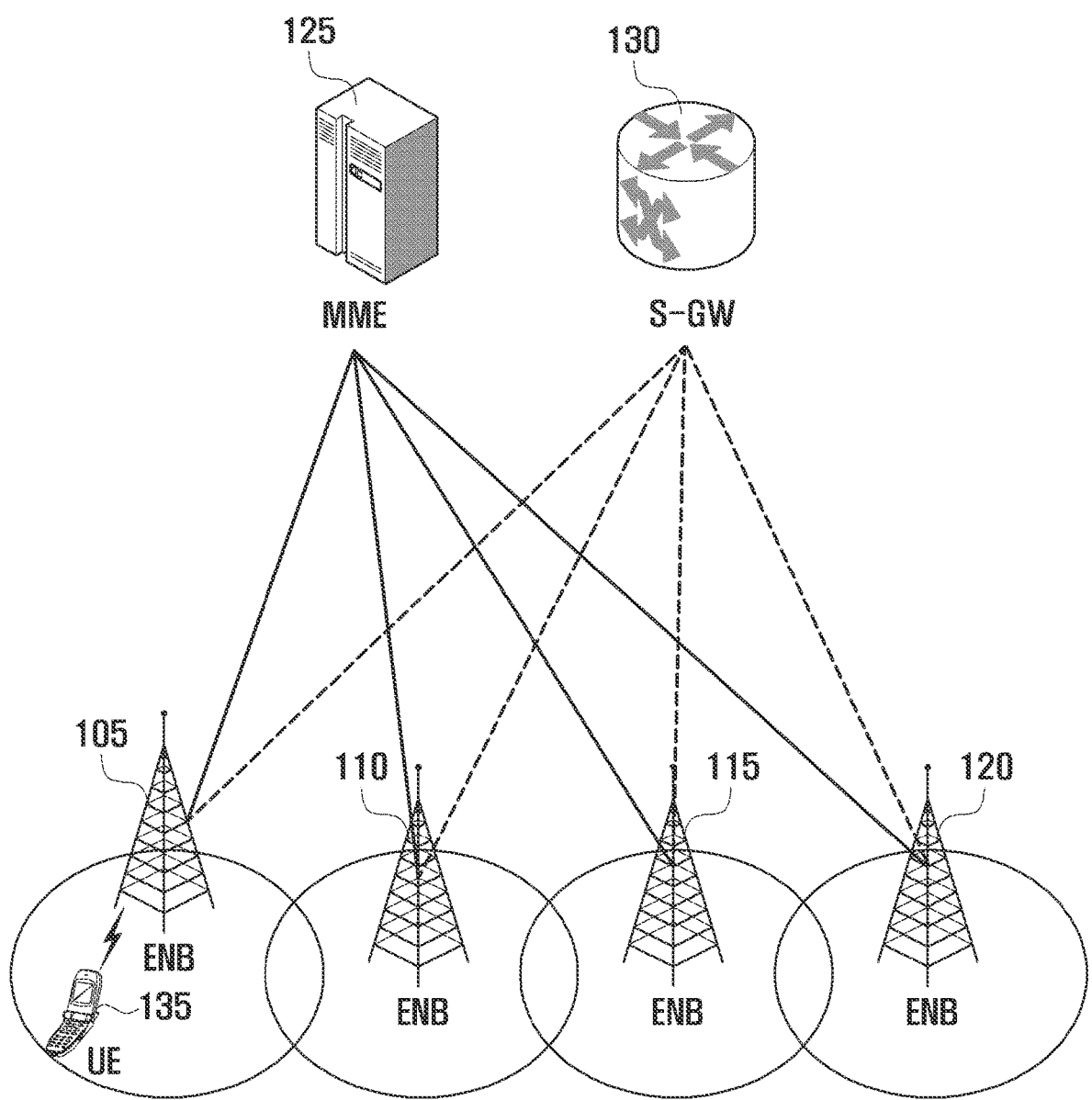
FIG. 1 is a diagram of a configuration of an LTE system according to an embodiment of the present invention.

Hereinafter, embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

Although the following disclosure describes embodiments of the present invention based on Long Term Evolution (LTE) defined in the specification of 3GPP, it should be understood that the subject matter of the present invention can also be applied to other communication systems that have similar technical backgrounds to the present invention. It will be also appreciated to those skilled in the art that the embodiments may be modified and the modifications may also be applied to other communication systems, without departing from the scope of the present invention.

In the following description, when a component is referred to as being "connected" or "accessed" to any other component, it should be understood that the component may be directly connected or accessed to the other component or the component may be electrically connected or accessed to the other component via a new component between them. The expression "have," "include," "comprises," "configure," " etc. refers to the existence of a corresponding feature (functions, operations, components, elements, etc.), and does not exclude one or more additional features. Therefore, the additional features may also be included in the scope of the present invention.

Blocks or units included in embodiments of the present invention are independently illustrated to describe different specific functions, and each of the blocks or units may not indicate separate hardware devices or one software module unit. That is, the individual blocks or units are arranged and included for the sake of convenience of description. Among the blocks or units, two or more blocks or units may be combined to serve as one block or unit, and one block or unit may be divided into a number of blocks or units to perform a corresponding function. The integrated embodiment of the blocks or units and the divided embodiments of each block or unit are included in the claims without departing from the spirit of the present invention.

In addition, part of the components or elements may not serve as necessary components or elements to perform an essential function in the present invention, but may serve as selective components or elements to improve performance. The present invention may be implemented to include only necessary components or elements to implement the spirit of the present invention excluding elements used to improve performance, and a structure including only necessary component or elements excluding selective elements used to improve performance is also included in the scope of the present invention.

Detailed descriptions of well-known functions and structures incorporated herein may be omitted to avoid obscuring the subject matter of the invention. Embodiments of the present invention are described in detail with reference to the accompanying drawings. The terms or words described in the description and the claims should not be limited by a general or lexical meaning, instead should be analyzed as a meaning and a concept through which the inventor defines and describes the invention to the best of his/her ability, to comply with the idea of the invention.

It should be understood that the processes, operations, and a combination thereof in the flowcharts can be performed via computer program instructions. These computer program instructions can be installed to processors of data processing equipment that can be programmed, special computers, or universal computers. The instructions, performed via the processors of data processing equipment or the computers, can generate means that perform functions described in a block (blocks) of the flowchart. In order to implement functions in a particular mode, the computer programming instructions can also be stored in a computer available memory or a computer readable recording memory that can support computers or data processing equipment that can be programmed. Therefore, the instructions, stored in the computer available memory or computer readable memory, can be installed to the products, and perform the functions therein, described in the block (blocks) of the flowchart therein. In addition, since the computer programming instructions can also be installed to computers or data processing equipment that can be programmed, they can generate processes that perform a series of operations therein, described in the blocks of the flowchart therein.

In the embodiments, the terminology, component '~unit,' refers to a software element or a hardware element such as a FPGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

In the following description, an LTE system and a carrier aggregation technology are briefly explained.

FIG. 1 is a diagram of a configuration of an LTE system according to an embodiment of the present invention.

With reference to FIG. 1, the LTE system configures the wireless access network, including evolved node Bs (called ENBs, eNBs, Node Bs or base stations) 105, 110, 115, and 120, a mobility management entity (MME) 125, and a serving-gateway (S-GW) 130. user equipment (UE) (which is also called a terminal) 135 is connected to an external network via the ENB 105, 110, 115, or 120 and the S-GW 130. ENBs 105 to 120 correspond to existing Node B of the universal mobile telecommunications system (UMTS). ENBs 105 to 120 are connected to UE 135 via wireless channels and are capable of performing more complicated functions than existing Node B. In an LTE system, since real-time services such as a voice over internet protocol (VoIP) service and all user traffic are serviced via shared channels, devices are required to collect information regarding states, such as buffer states of UE devices, available transmission power states, channel states, etc., and to make a schedule. This job is performed via ENBs 105 to 120. One ENB controls a number of cells. For example, in order to implement a transmission rate of 100 Mbps, an LTE system employs orthogonal frequency division multiplexing (OFDM) as a wireless access technology at a bandwidth of 20 MHz. It also employs adaptive modulation & coding (AMC) to determine modulation scheme and channel coding rate, meeting with the channel state of UE 135. The S-GW 130 is a device that provides data bearers. The S-GW 130 establishes or removes data bearers according to the control of the MME 125. The MME 125 manages the mobility of UE and controls a variety of functions. The MME 125 connects to a number of ENBs 105 to 120.

Figure 2:
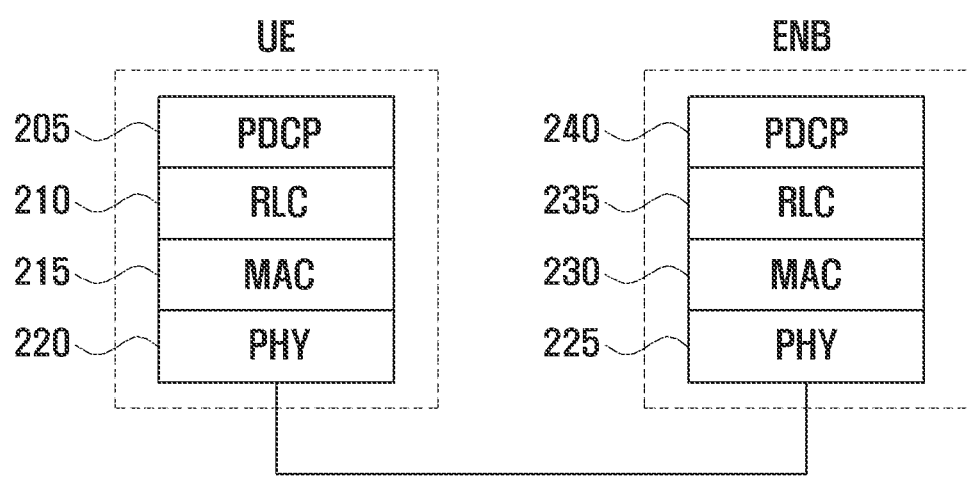
FIG. 2 is a diagram of a radio protocol stack in an LTE system according to embodiments of the present invention.

FIG. 2 is a diagram of a radio protocol stack in an LTE system according to embodiments of the present invention.

With reference to FIG. 2, UE and ENB have packet data convergence protocol (PDCP) 205 and 240, radio link control (RLC) 210 and 235, and medium access control (MAC) 215 and 230, respectively. PDCP 205 and 240 compress/decompress the IP header. RLC 210 and 235 reconfigure PDCP packet data unit (PDU) in proper size and perform an automatic repeat request (ARQ) operation. MAC 215 and 230 connect to a number of RLC layer devices configured in one UE device. MAC 215 and 230 multiplex RLC PUDs to MAC PDU, and de-multiplex RLC PDUs from MAC PDU. Physical layers (PHY) 220 and 225 in UE and ENB are capable of channel-coding and modulating data from the higher layers, creating OFDM symbols, and transmitting them via a wireless channel. In addition, PHY 220 and 225 are capable of demodulating and channel-decoding OFDM symbols transmitted via a wireless channel, and transferring them to the higher layers. In addition, the PHY 220 and 225 use hybrid ARQ (HARQ) to perform additional error correction. The receiver transmits, to the transmitter, a 1-bit signal for a condition as to whether it has received a packet transmitted from the transmitter, which is called HARQ ACK/NACK information. Downlink HARQ ACK/NACK information in response to the uplink transmission is transmitted via a physical channel, physical hybrid-ARQ indicator channel (PHICH). Uplink HARQ ACK/NACK information in response to the downlink transmission is transmitted via a physical channel, physical uplink control channel (PUCCH) or physical uplink shared channel (PUSCH).

Pre-allocation as one of the latency reduction schemes may be considered.

Pre-allocation is a technique that allows an ENB to allocate, although it has not received a transmission resource request from UE, uplink transmission resources to the UE. Pre-allocation causes a problem that an ENB allocates, although it has not received a transmission resource request, transmission resources to UE that does not have data to be transmitted inevitably.

In the current specification, although UE does not have data to be transmitted, when the UE is allocated an uplink grant, it is enforced to create and transmit a padding MAC PDU. The padding MAC PDU refers to an MAC PDU which includes only padding bits and a padding buffer status report (BSR) without including meaningful data. The rule is defined assuming that the frequency of occurrence of padding MAC PDU is extremely low.

The transmission rule of padding MAC PDU is advantageous because it assists an ENB to control the uplink transmission power and simplifies the implementation of a related ENB. When the ENB controls the transmission power for a UE device, it is capable of referring to the statistics of occurrence of HARQ ACK/NACK messages in response to MAC PDU transmitted from the UE. For example, when HARQ NACK has never occurred, it means that the current transmission power control method is proper. In contrast, when HARQ NACK relatively frequently occurs, it may indicate that the uplink transmission power control method currently in use needs to be modified.

The present invention provides new operations to UE which is allocated resources but does not perform the uplink transmission since it does have data to be transmitted, thereby using the pre-allocation with efficiency. Since a legacy ENB expects a reverse transmission when resources are allocated, it is preferable that the legacy ENB does not employ new operations described above. In the following description, for the sake of convenience, when a transmission resource is available, the uplink transmission is unconditionally performed, which is called an unconditional transmission operation. In addition, although a transmission resource is available, the transmission is performed only when it satisfies a preset condition, which is called a conditional transmission operation.

For example, UE set with a conditional transmission operation may be configured with a semi-persistent scheduling (SRS) uplink transmission. In this case, the first transmission by the SPS and the non-adaptive re-transmission may conflict with each other at a TTI. In this case, the first transmission may have priority over the non-adaptive re-transmission. However, when UE does not have data (signals) to be transmitted in the first transmission, it may perform the non-adaptive re-transmission prior to the first transmission.

More specifically, in embodiments of the present invention, UE may selectively employ an unconditional transmission operation or a conditional transmission operation according to the instruction of an ENB. The present invention has the following features.

The conditional transmission operation may be employed according to types of transmission resources and a serving cell performing the uplink transmission. For example, a conditional transmission operation is applied to only the SPS uplink transmission of a serving cell configured via radio resource control (RRC), and an unconditional transmission operation is applied to the remaining uplink transmission.

The conditional transmission operation is employed only when it is set via RRC.

The conditional transmission operation refers to a process or operation that, although an uplink grant for the first transmission is available, the transmission is not performed, except for a case that transmittable data exists. Transmittable data may contain at least one of the following: data available for transmission in PDCP layer (defined in TS 36.323), data available for transmission in RLC layer (defined in TS 36.322), and MAC CE (defined in TS 36.321) that includes as follows.

A short BSR triggered via a padding BSR, the remaining uplink MAC CE except for a long BSR or a truncated BSR; more specifically, power headroom report, C-RNTI MAC CE, a long BSR or a short BSR triggered via a regular BSR.

When confliction between the first transmission and the non-adaptive re-transmission occurs in UE set with the conditional transmission operation at a TTI, the UE is capable of selecting the first transmission or the non-adaptive re-transmission according to a type of transmission resource for the first transmission and performing the selected transmission.

When non-adaptive re-transmission conflicts with the first transmission by SPS (or configured uplink grant), the non-adaptive re-transmission is performed.

When non-adaptive re-transmission conflicts with the first transmission by a normal uplink grant, the first transmission is performed.

Figure 3:
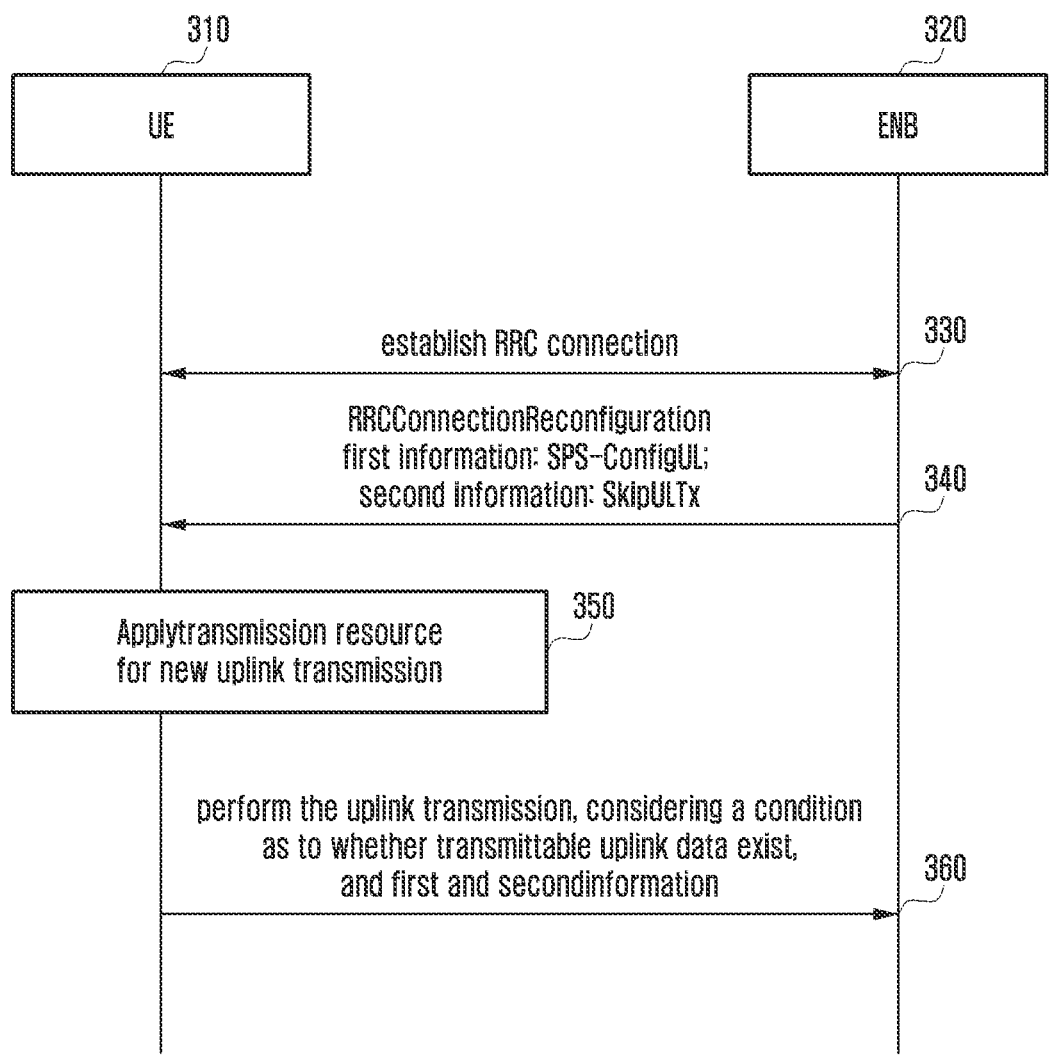
FIG. 3 is a flowchart that describes the uplink transmission according to an embodiment of the present invention.

FIG. 3 is a flowchart that describes the uplink transmission according to an embodiment of the present invention.

With reference to FIG. 3, in a mobile communication system including UE 310, an ENB 320, and other nodes (not shown), the UE 310 establishes the RRC connection with the ENB 320 in operation 330. Establishing the RRC connection means that ENB 320 and UE 310 configure a signaling radio bearer (SRB) so that they can exchange RRC control messages with each other. The RRC connection may be established via a random access process in such a way that: UE 310 transmits an RRC connection establishment request message to an ENB 320; the ENB 320 transmits an RRC connection establishment message to the UE 310; and the UE 310 transmits an RRC connection establishment complete message to the ENB 320.

After establishing the RRC connection in operation 330, the ENB 320 is capable of instructing the UE 310 to perform the RRC connection re-configuration in operation 340. The ENB 320 is capable of transmitting, to the UE 310, the SPS configuration information (SPS-ConfigUL) and information instructing to perform a conditional transmission operation (SkipULTx), via the RRC connection re-configuration message. That is, although the uplink transmission resource is available, the RRC connection re-configuration message may contain a condition as to whether the UE 310 performs, only when the UE 310 has data to be transmitted, the uplink transmission on the allocated transmission resource.

In another embodiment, the information regarding a condition as to whether the UE employs the conditional transmission operation may be contained in the lower information of SPS-ConfigUL of the RRCConnectionReconfiguration message, and may be defined as the format of ENUMERATED {SETUP}, called SkipUplinkTransmission. For example, when SPS-ConfigUL of the RRCConnectionReconfiguration message received by the UE 310 contains SkipUplinkTransmission indicated by SETUP, it means that a type of physical uplink shared channel (PUSCH) transmission by a serving cell may be indicated as a conditional transmission operation. On the other hand, when SPS-ConfigUL of the RRCConnectionReconfiguration message does not contain SkipUplinkTransmission indicated by SETUP, it means that all the PUSCH transmissions by a serving cell may be indicated as an unconditional transmission operation. In this case, the serving cell may be indicated by information, i.e., SemiPersistSchedSCell.

The SPS configuration information may be defined as in the following tables 1 to 3. In particular, the SPS configuration information may newly employ a relatively shorter cycle, using spare 6, spare 5, and spare 4 of semiPersistSchedIntervalUL. For example, the new cycle may be sf1, sf2, sf4, or the like.

TABLE 1

|  |  |  |  |
|---|---|---|---|
| semiPersistSchedC-RNTI | C-RNTI | OPTIONAL, | -- Need OR |
| sps-ConfigDL | SPS-ConfigDL | OPTIONAL, | -- Need ON |
| sps-ConfigUL | SPS-ConfigUL | OPTIONAL | -- Need ON |

```
}
...
SPS-ConfigUL ::= CHOICE {
    release                 NULL,
    setup                   SEQUENCE {
        semiPersistSchedIntervalUL
                            ENUMERATED {
                                sf10, sf20, sf32, sf40, sf64, sf80,
                                sf128, sf160, sf320, sf640, spare6,
                                spare5, spare4, spare3, spare2,
                                spare1},
        implicitReleaseAfter  ENUMERATED {e2, e3, e4, e8},
        p0-Persistent         SEQUENCE {
            p0-NominalPUSCH-Persistent    INTEGER (-126..24),
            p0-UE-PUSCH-Persistent        INTEGER (-8..7)
        }  OPTIONAL,                                          -- Need OP
        twoIntervalsConfig    ENUMERATED {true}               OPTIONAL, -- Cond
TDD
        ...,
        [[ p0-PersistentSubframeSet2-r12     CHOICE {
            release                          NULL,
            setup                            SEQUENCE {
                p0-NominalPUSCH-PersistentSubframeSet2-r12    INTEGER (-126..24),
                p0-UE-PUSCH-PersistentSubframeSet2-r12        INTEGER (-8..7)
            }                                                 OPTIONAL -- Need
        }
ON
        ]]
    }
}
N1PUCCH-AN-PersistentList ::=    SEQUENCE (SIZE (1..4)) OF INTEGER (0..2047)
-- ASN1STOP
```

TABLE 2

| SPS-Config field descriptions |
|---|
| implicitReleaseAfter |
| Number of empty transmissions before implicit release, see TS 36.321 [6, 5.10.2]. Value e2 corresponds to 2 transmissions, e3 corresponds to 3 transmissions and so on. |
| n1PUCCH-AN-PersistentList , n1PUCCH-AN-PersistentListP1 |
| List of parameter: $n_{PUCCH}^{(1, p)}$ for antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured. |
| numberOfConfSPS-Processes |
| The number of configured HARQ processes for Semi-Persistent Scheduling, see TS 36.321 [6]. |
| p0-NominalPUSCH-Persistent |
| Parameter: $P_{O\_NOMINAL\_PUSCH}(0)$. See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1. |
| p0-NominalPUSCH-PersistentSubframeSet2 |
| Parameter: $P_{O\_NOMINAL\_PUSCH}(0)$. See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2. |
| p0-UE-PUSCH-Persistent |
| Parameter: $P_{O\_UE\_PUSCH}(0)$. See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1. |

TABLE 2-continued

SPS-Config field descriptions p0-UE-PUSCH-PersistentSubframeSet2

Parameter: $P_{O\_UE\_PUSCH}(0)$. See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2.

semiPersistSchedC-RNTI

Semi-persistent Scheduling C-RNTI, see TS 36.321 [6].

semiPersistSchedIntervalDL

Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g., sf10 corresponds to 10 sub-frames, sf32 corresponds to 30 sub-frames, sf128 corresponds to 120 sub-frames.

semiPersistSchedIntervalUL

Semi-persistent scheduling interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g., sf10 corresponds to 10 sub-frames, sf32 corresponds to 30 sub-frames, sf128 corresponds to 120 sub-frames.

twoIntervalsConfig

Trigger of two-intervals-Semi-Persistent Scheduling in uplink. See TS 36.321 [6, 5.10]. If this field is present, two-intervals-SPS is enabled for uplink. Otherwise, two-intervals-SPS is disabled.

TABLE 3

| Conditional presence | Explanation |
| --- | --- |
| TDD | This field is optional present for TDD, need OR; it is not present fo rFDD and the UE shall delete any existing value for this field. |

When an uplink transmission resource allocated for new transmission is available in operation 350, UE 310 determines whether the uplink transmission is performed in operation 360. The uplink transmission resource allocated for the new transmission may be a transmission resource which is allocated via PDCCH addressed by a C-RNTI of UE 310 or a transmission resource for SPS, i.e., configured UL grant.

UE 310 determines whether it performs the transmission via the uplink transmission resource (or whether it creates MAC PDU to be transmitted via the uplink transmission resource), considering SPS-ConfigUL, SkipUplinkTransmission, a condition as to whether SemiPersistSchedSCell exists and the value, a characteristic of an available transmission resource, a condition as to whether transmittable data exists, etc.; and performs or does not perform the uplink transmission, based on the determination in operation 360.

When the HARQ re-transmission is triggered to a subframe used by an uplink grand for the first transmission, the UE 310: determines to perform the first transmission or the re-transmission, considering SPS-ConfigUL, SkipUplinkTransmission, a condition as to whether SemiPersistSchedSCell exists and the value, a characteristic of the first available transmission resource, and a type of re-transmission; and performs the uplink transmission. This will be described in detail later.

Figure 4:
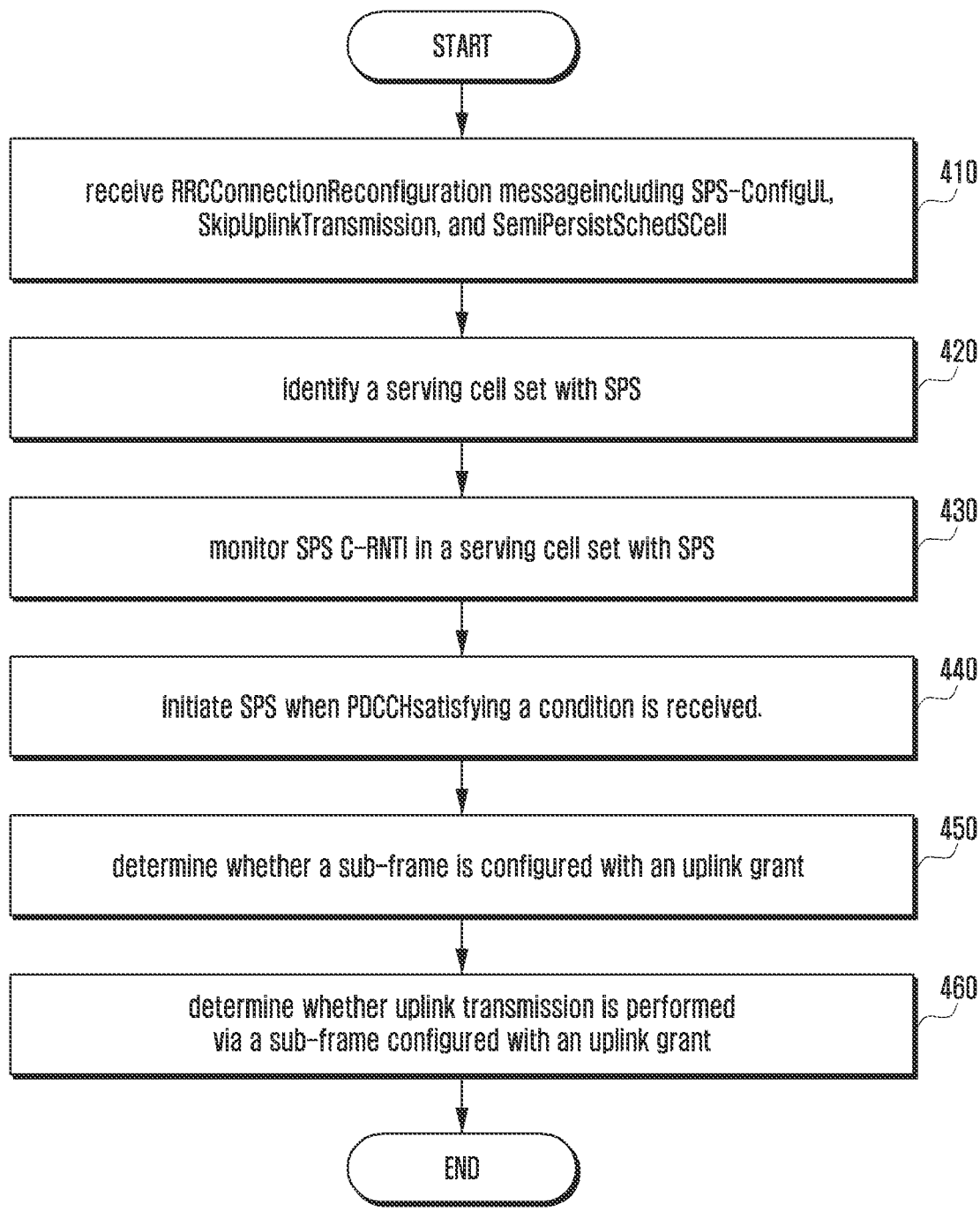
FIG. 4 is a flowchart that describes operations of UE according to an embodiment of the present invention.

FIG. 4 is a flowchart that describes operations of UE according to an embodiment of the present invention.

With reference to FIG. 4, UE 310 is capable of receiving a control message, RRCConnectionReconfiguration, from the ENB 320 in operation 410. The control message may contain the following information.

SPS-ConfigUL: uplink SPS configuration information
semiPersistSchedIntervalUL

ENUMERATED {
    sf10, sf20, sf32, sf40, sf64, sf80,
    sf128, sf160, sf320, sf640, sf1,
    sf2, sf4, spare3, spare2,
    spare1}

SkipUplinkTransmission: conditional transmission instruction instruction. Enumerate {SETUP}

SemiPersistSchedSCell: information indicating a serving cell to use uplink SPS, including ServCellIndex and/or SCellIndex Referring back to FIG. 4, UE 310 is capable of identifying a serving cell set with SPS in operation 420.

The serving cell may be set with SPS as follows.

When SemiPersistSchedSCell is signaled (or configured), a serving cell indicated by the SemiPersistSchedSCell may be set with SPS.

When SemiPersistSchedSCell is not signaled (or configured), PCell or PSCell is a serving cell set with SPS. When the dual connectivity is not set up or when the MAC entity set with the SkipUplinkTransmission is an MAC entity for MCG, PCell is a serving cell set with SPS. When the MAC entity set with the SkipUplinkTransmission is an MAC entity for SCG, PSCell is a serving cell set with SPS.

UE 310 is capable of initiating the monitoring of an SPS C-RNTI in a serving cell set with SPS (or in a scheduling cell of a serving cell set with SPS) in operation 430. The scheduling cell refers to a serving cell that performs the transmission of scheduling signals (downlink assignment and uplink grant) for a serving cell set with a cross carrier scheduling.

When UE 310 receives physical downlink control channel (PDCCH) satisfying the following condition in operation 440, it ascertains that the uplink SPS has been initialized and proceeds with operation 450.

UE receives uplink grant via PDCCH addressed by semi-persistent scheduling C-RNTI of a corresponding MAC entity, from a serving cell set with SPS (or a scheduling cell of a serving cell set with SPS).

When a new data indicator (NDI) of the uplink grant is '0,' PDCCH does not indicate the SPS release.

Referring back to FIG. 4, UE 310 ascertains that uplink grants configured in a sub-frame satisfying the following equation occur sequentially in operation 450. That is, UE 310 detects a sub-frame where an uplink grant is configured, based on the following equation.

$$-(10*SFN+\text{subframe})=[(10*\text{SFNstart time}+\text{subframe-start time})+N*\text{semiPersistSchedIntervalUL}+\text{Subframe\_Offset}*(N\text{modulo}2)]\text{modulo}10240.$$

Where SFNstart time and subframestart time are the SFN and subframe, respectively, at the time the configured uplink grant were (re-)initialized.

In this case, '0' is substituted into the Subframe_Offset.

UE 310 determines whether it performs the uplink transmission, via a sub-frame where an uplink grant has been configured, as follows, in operation 460.

For a sub-frame where an uplink grant of a serving cell set with SPS is configured, UE has received an uplink grant addressed (scheduled) by a C-RNTI via PDCCH of a corresponding serving cell.

When NDI of the PDCCH is toggled, UD ascertains that the first transmission has been indicated (ignored the configured uplink grant), and performs the first transmission for the uplink grant received via a C-RNTI.

When NDI of the PDCCH is not toggled, UD ascertains that the adaptive re-transmission has been indicated (ignored the configured uplink grant), and performs the adaptive re-transmission for the uplink grant received via a C-RNTI.

For a sub-frame where an uplink grant of a serving cell set with SPS is configured, UE has not received an uplink grant via PDCCH.

When SkipUplinkTx has not been configured, UE ascertains that the first transmission is triggered by the configured uplink grant.

When: SkipUplinkTx has been configured; transmittable data exists; and data is not stored in a HARQ buffer of a corresponding HARQ process (i.e., non-adaptive re-transmission is not triggered), UE ascertains that the first transmission is triggered by the configured uplink grant.

When: SkipUplinkTx has been configured; transmittable data exists; and data is stored in a HARQ buffer of a corresponding HARQ process (i.e., non-adaptive re-transmission is triggered), UE ascertains that the non-adaptive re-transmission is triggered.

When: SkipUplinkTx has been configured; transmittable data does not exist; and data is stored in a HARQ buffer of a corresponding HARQ process (i.e., non-adaptive re-transmission is triggered), UE ascertains that the non-adaptive re-transmission is triggered.

When: SkipUplinkTx has been configured; transmittable data does not exist; and data is not stored in a HARQ buffer of a corresponding HARQ process (i.e., non-adaptive re-transmission is not triggered), UE ascertains that the uplink transmission is not triggered and does not perform the uplink transmission at a corresponding TTI of a corresponding serving cell.

When the first transmission is triggered by an uplink grant received via a C-RNTI, UE performs the following operations.

The UE considers NDI of a corresponding HARQ process to be toggled, and transmits HARQ information related to the received uplink grand to an HARQ entity of a corresponding serving cell.

The HARQ entity performs the first uplink transmission by employing the uplink grant.

When the adaptive re-transmission is triggered by an uplink grant received via a C-RNTI, UE performs the following operations.

The UE considers that NDI of a corresponding HARQ process is not toggled, and transmits HARQ information related to the received uplink grand to an HARQ entity of a corresponding serving cell.

The HARQ entity performs the adaptive re-transmission by employing the uplink grant.

When the first transmission is triggered by a configured uplink grant, UE performs the following operations.

The UE considers NDI of a corresponding HARQ process to be toggled, and transmits HARQ information related to the configured uplink grand to an HARQ entity of a corresponding serving cell.

The HARQ entity performs the first uplink transmission by employing the configured uplink grant.

When the non-adaptive re-transmission is triggered, UE performs the following operations.

The UE considers that NDI of a corresponding HARQ process is not toggled, and performs the uplink transmission of data, stored in a HARQ buffer of a corresponding HARQ process, by employing a stored uplink grant.

Mobile communication systems have been developed to provide a communication service to users while they are moving. With the rapid development of technology, mobile communication systems have been developed to provide data communication services at a high speed as well as voice communication. In recent years, Long Term Evolution (LTE) that has been developed as a next generation mobile communication system is in process of standardization by the 3rd Generation Partnership Project (3GPP). LTE-A refers to a technology that is in the process of standardization by around the latter half of 2010 to implement high speed packet-based communication of a transmission speed higher than the data transmission rate which has been currently provided.

With the evolution of 3GPP standard, discussion has been made about a method of easily optimizing a wireless network as well as a method of increasing communication speed. In general, an eNB or an eNB control station needs to collect information regarding a wireless environment for its cell coverage when initially constructing a wireless network or optimizing a network, which is called a drive test. An existing drive test is performed in such a way that an operator drives a car with measurement equipment and repetitively conducts the measurement for a relatively long period of time, which makes the operator troublesome. The measurement result is analyzed and the analyzed result is used to set system parameters of eNBs or eNB control stations. The existing drive test increases the optimizing and running costs of a wireless network and takes much time to conduct the operation. Therefore, researches are made to minimize drive test and improve the manual configuration and the analysis process for a wireless environment, which is called minimization of drive test (MDT). To this end, while a UE device is measuring a wireless channel, instead of performing a drive test, the UE device transmits the corresponding wireless channel measurement to the eNB, periodically or when a specified event occurs. Alternatively, the UE device stores the wireless channel measurement and then transmits it to the eNB after a preset period of time has elapsed. In the following description, the process for UE to transmit its measurement information regarding a wireless channel and other addition information to an eNB is called a process of reporting MDT measurement information. In this case, when UE can communicate with an eNB, it immediately transmits the channel measurement result to the eNB. When UE cannot immediately transmit or report the channel measurement result to the eNB, it records the MDT measurement information and then report the recorded MDT measurement information to the eNB when communication is possible. The eNB receives the MDT measurement information from the UE, and optimizes the cell coverage by using the received information.

Figure 5:
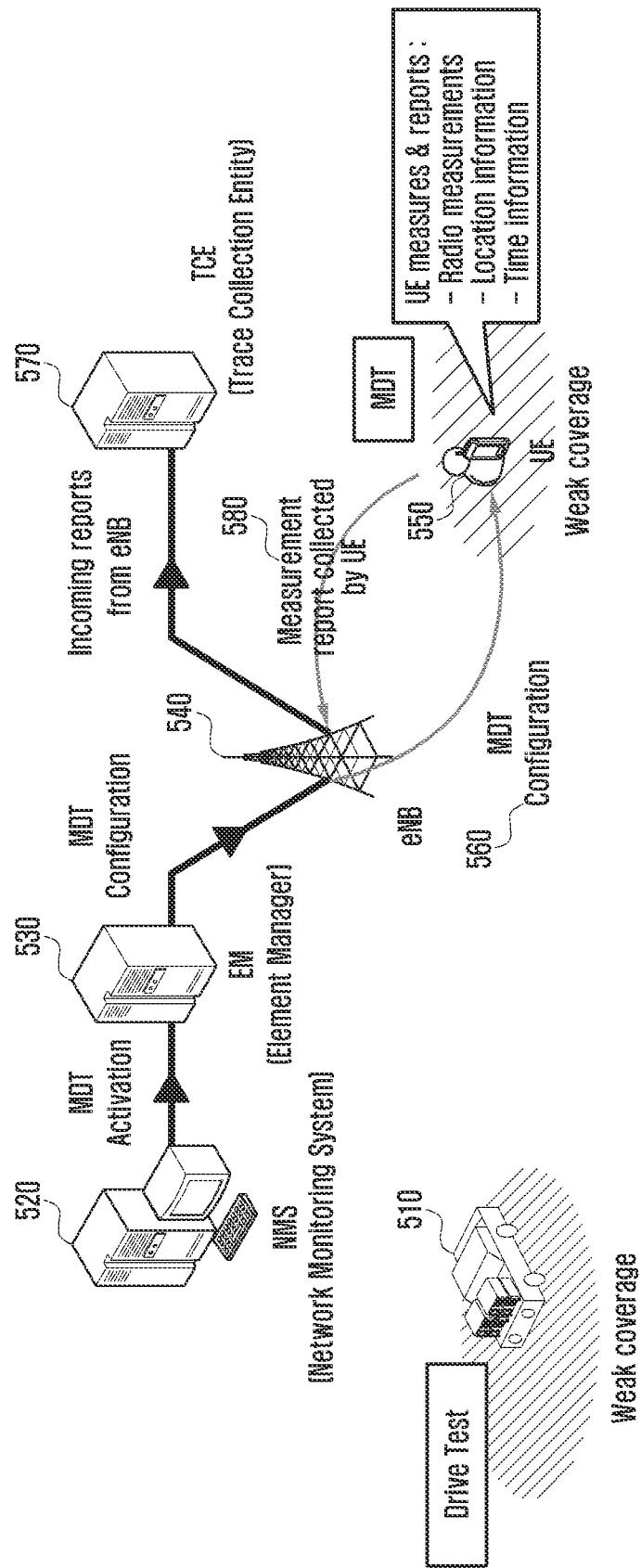
FIG. 5 is a diagram showing the concept of Minimization of Drive Test (MDT)

FIG. 5 is a diagram showing the concept of Minimization of Drive Test (MDT).

With reference to FIG. 5, an existing drive test 510 is performed in such a way that an operator drives a car with measurement equipment about the service coverage to find a gap area and measures signal states using the measurement equipment. In the MDT, UE 550 performs the measurement.

The network monitoring system (NMS) 520 is capable of instructing to perform the MDT. To this end, the NMS 520 provides necessary configuration information to the element manager (EM) 530. The EM 530 creates an MDT configuration and transmits it to the eNB 540. The eNB 540 transmits the MDT configuration to the UE 550 and instructs to perform the MDT in operation 560. The UE 550 collects MDT measurement information. The MDT measurement information may contain signal measurement information, measurement locations, and time information. The UE 550 reports the collected MDT measurement information to the eNB 540 in operation 580. The eNB 540 transmits the collected information to the trace collection entity (TCE) 570. The TCE 570 is referred to as a server collecting MDT measurement information.

An embodiment of the present invention provides a method and apparatus that: records useful information when UE fails in connecting to perform MDT a mobile communication system; and efficiently obtains location information regarding UE in an idle mode.

In the following description, a method for UE to perform the MDT in an idle mode is explained in detail.

Figure 6:
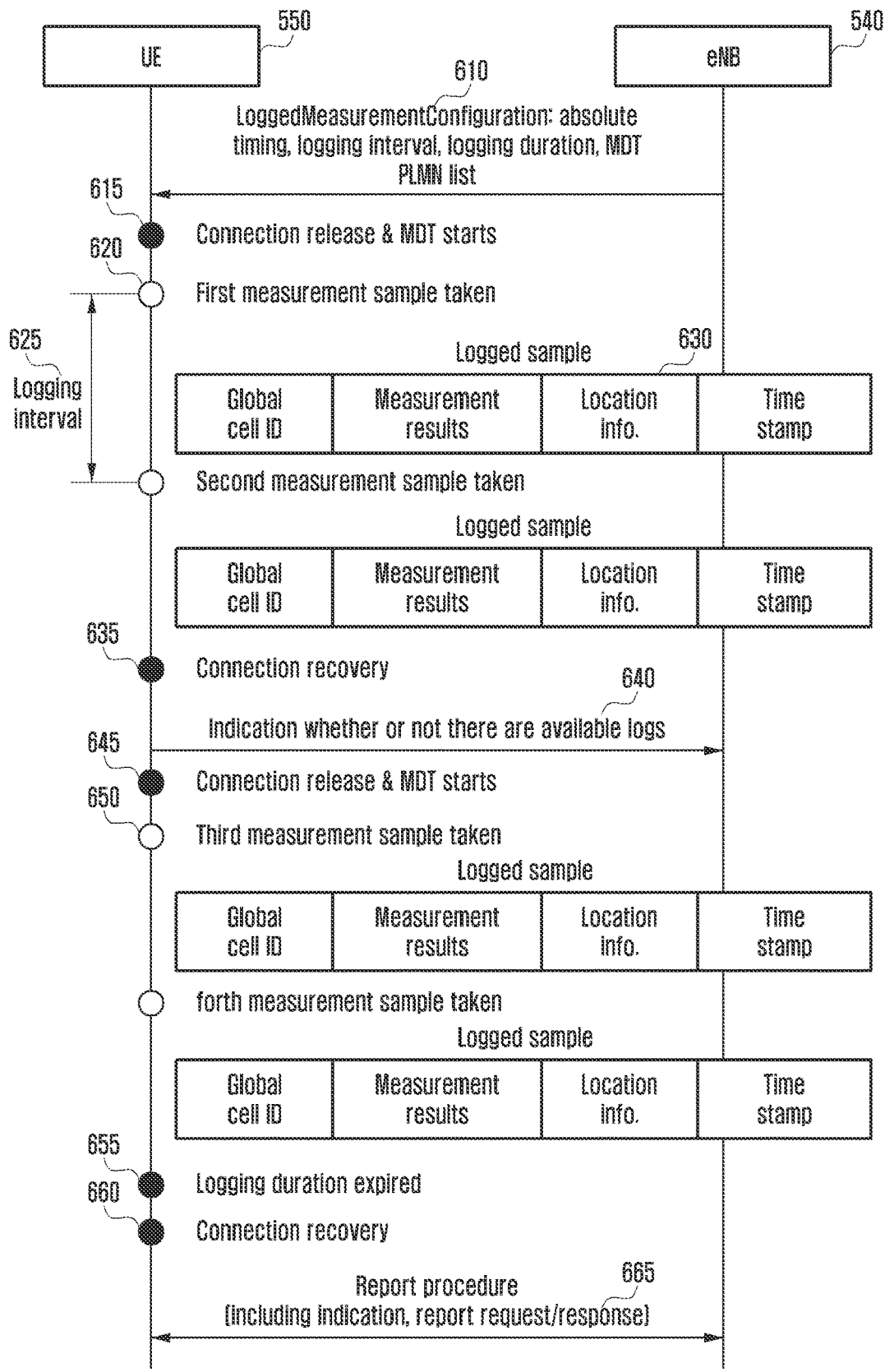
FIG. 6 is a flow diagram that describes a method for UE to record MDT measurement information in an idle mode and to perform the MDT measurement in a reporting operation.

FIG. 6 is a flow diagram that describes a method for UE to record MDT measurement information in an idle mode and to perform the MDT measurement in a reporting operation.

With reference to FIG. 6, the eNB 540 configures MDT, and transmits corresponding information, e.g., channel measurement configuration information (MDT configuration), to UE 550 in connection mode in operation 610. The corresponding information contains absolute timing reference information, logging interval, logging duration, MDT PLMN list, etc. The logging interval is referred to as one sampling cycle and is used to measure a periodical downlink pilot signal. The UE 550 collects and records MDT measurement information every provided cycle. The logging duration is referred to as the total period of time to perform MDT. The MDT PLMN list is referred to as a list of PLMNs through which UE 550 reports MDT measurement information. When a preset period of time has elapsed, UE 550 stops the MDT operation.

When UE 550 changes the RRC state from a connection mode to an idle mode, it starts the MDT in operation 615. Since the first MDT measurement is performed and recorded in operation 620, the UE 550 continues to perform the MDT measurement and the recording of the MDT every previously received sampling cycle in operation 625. As shown in diagram 630, the MDT measurement information is recorded every measurement sample. The recorded MDT measurement information may contain an ID of a serving cell, channel measurement information regarding a serving cell (i.e., RSRP/RSRQ value, etc.), channel measurement information regarding neighboring cell, location information regarding UE, relative time information, etc.

When UE 550 enters a connection mode in operation 635, it informs the eNB 540 whether it has recorded MDT measurement information in operation 640. The eNB 540 may request a report from the UE 550 according to conditions. When the UE 550 receives a request from the eNB 540, it reports MDT measurement information that it has recorded to the eNB 540 and then removed the recorded information. On the other hand, when the UE 550 does not receive a request from the eNB 540, it continues to maintain the recorded information.

When the UE 550 returns to an idle mode in operation 645 and a period of time corresponding to the measurement duration has not elapsed, the UE 550 continues to perform the MDT operation and collect the MDT measurement information in operation 650. The measurement duration may or may not consider a period of time in a connection mode.

When the measurement duration has expired, the UE 550 stops the MDT in operation 655. When the UE 550 enters a connection mode in operation 660, it informs the eNB 540 that it has recorded MDT measurement information.

When the UE 550 receives the request from the eNB 540, it performs the procedure for reporting recorded MDT measurement information to the eNB 540 in operation 665.

Figure 7:
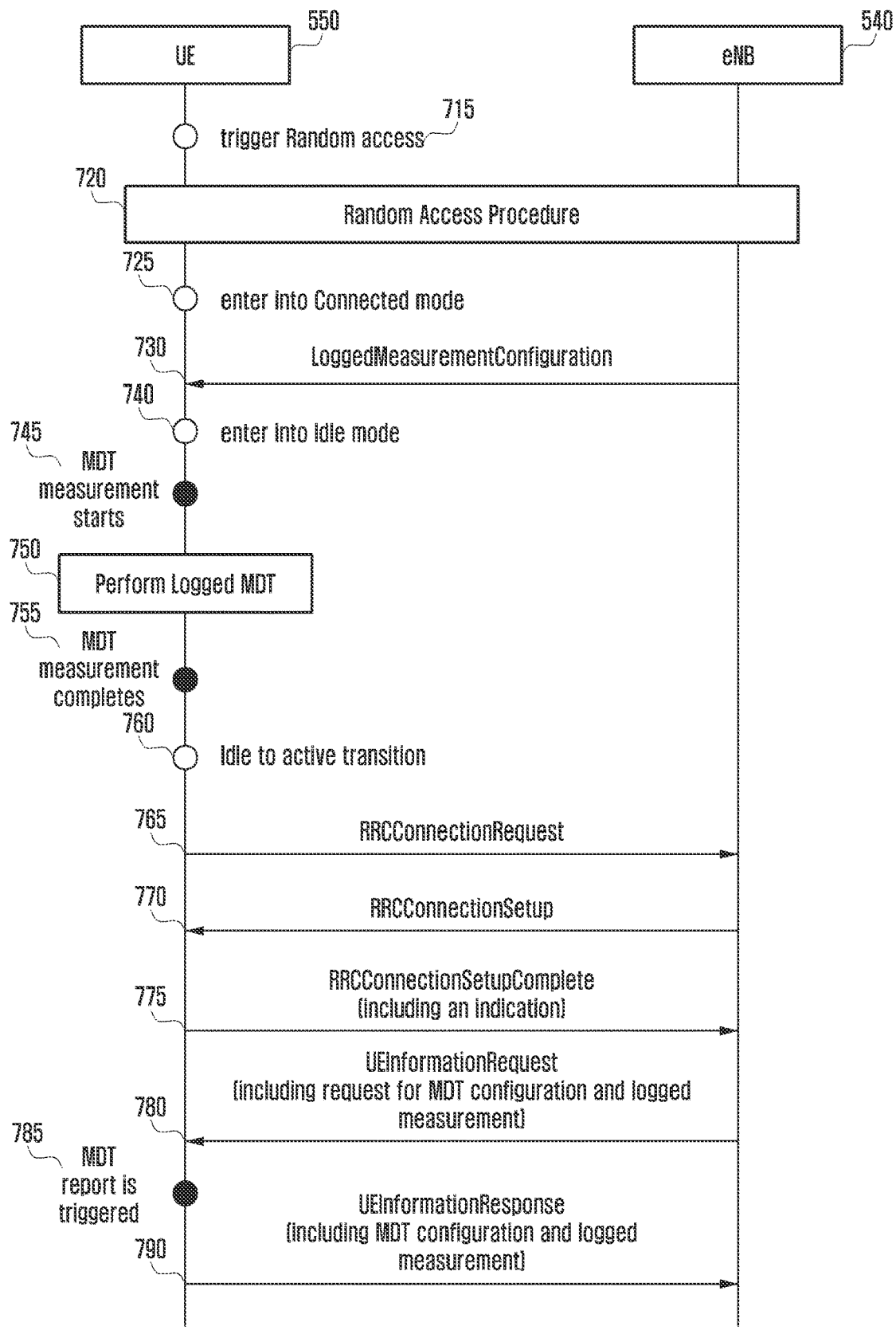
FIG. 7 is a flow diagram that describes a method for UE to report recorded channel measurement information to an eNB according to the request of the eNB.

FIG. 7 is a flow diagram that describes a method for UE to report recorded channel measurement information to an eNB according to the request of the eNB.

With reference to FIG. 7, UE 550 triggers an access attempt to communicate with the eNB 540 in operation 715. UE 550 attempts a random access in operation 720.

After that, UE 550 enters a connection mode in operation 725. The eNB 540 transmits, to UE 550, information that UE uses to perform the MDT in an idle mode, i.e., channel measurement configuration information, via a message, LoggedMeasurementConfiguration, in operation 730.

After that, UE 550 changes the current mode to an idle mode in operation 740. When a timing to perform the MDT measurement arrives, the UE 550 performs the MDT measurement in operation 745. The UE 550 performs the logged MDT in operation 750. When a preset period of time has elapsed, UE 550 stops the MDT measurement in operation 755.

UE 550 decides to change the current mode to a connection mode in operation 760. UE 550 transmits an RRC connection request message, RRCConnectionRequest, to the eNB 540 in operation 765. When the eNB 540 permits the RRC connection request, it transmits an RRC connection setup message, RRCConnectionSetup, to the UE 550 in operation 770. UE 550 in a connection mode informs the eNB 540 that it has channel measurement information recorded in an idle mode in operation 775.

To this end, the UE 550 transmits, to the eNB 540, an RRC connection setup complete message, RRCConnectionSetupComplete, including one indication representing that the UE 550 has channel measurement information recorded in an idle mode. UE 550 does not transmit the indication to all the PLMNs, but transmits the indication to the current RPLMN included in the MDT PLMN list. The registered public land mobile network (RPLMN) is referred to as a PLMN from which UE 550 receives services. When UE 550 is turned on or needs to change the current PLMN, it determines a PLMN suitable for itself via a tracking area updating (TAU) process, i.e., a selected PLMN, and reports the selected PLMN to the MME (not shown). When the MME ascertains that the selected PLMN is suitable, it informs the UE 550 that the selected PLMN is suitable, so that the selected PLMN serves as an RPLMN.

In the case of handover, the UE 550 is capable of including the indication, representing that it has channel measurement information recorded in an idle mode, in the message, RRCConnectionReconfigurationComplete.

When the UE 550 transmits the indication to the eNB 540, this means that the UE 550 informs the eNB 540 whether it has recorded MDT measurement information, so that the eNB 540 can determine whether it requests the transmission of MDT measurement information from the UE 550, based on the indication. For example, since UE 550 operates in idle mode for a relatively long period of time, it may record a relatively large amount of channel measurement information. In this case, when the UE 550 switches the current mode to a connection mode, it needs a relatively large amount of resources for the transmission of the recorded information. The eNB 540 determines whether it receives the report of the MDT measurement information from the UE 550, considering the current wireless capacity condition, etc. When the eNB 540 ascertains that the channel measurement information recorded by the UE 550 is useful, it requests the MDT measurement information from the UE, via a UE information request message, UEInformationRequest, in operation 780.

When the UE 550 receives the UE information request from the eNB 540, it triggers the transmission of MDT measurement information that it has recorded to the eNB 540 in operation 785. In general, the recorded MDT measurement information does not need to be immediately transmitted. Therefore, the recorded MDT measurement information needs to be transmitted, considering the priority of other RRC messages and normal data. UE 550 transmits a UE information response message, UEInformationResponse, including MDT measurement information, to the eNB 540 in operation 790. In another embodiment, UE 550 may delete the MDT measurement information that has been transmitted once to the eNB.

Figure 8:
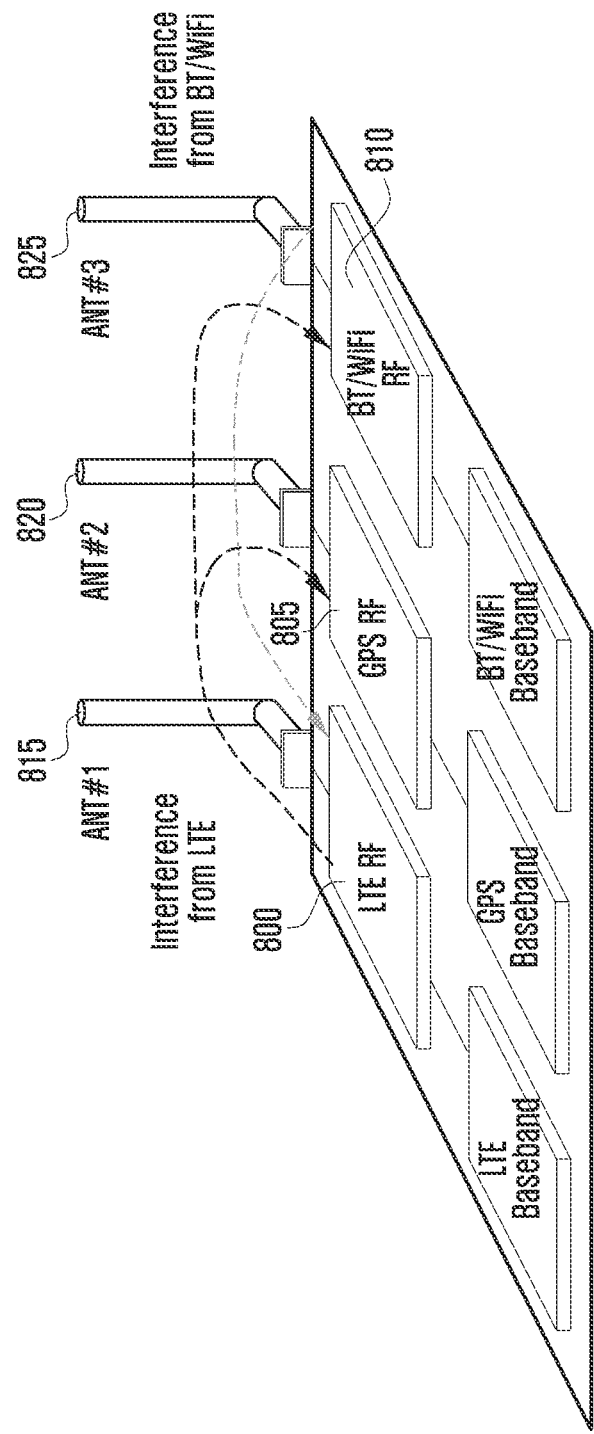
FIG. 8 is a diagram that describes in-device coexistence (IDC)

FIG. 8 is a diagram that describes in-device coexistence (IDC).

In-device coexistence (IDC) is referred to as a technology that minimizes interference between communication modules in a device, and is in the process of research. Recent UE devices have been equipped with various functions and included various types of communication modules to support the functions. With reference to FIG. 8, UE is capable of including various communication modules as well as an LTE communication module 800, e.g., a GPS module 805, a short-range communication module 810, etc. The short-range communication module 810 includes a Bluetooth module, a WLAN module, etc. These modules 800, 805 and 810 perform the transmission/reception of data via corresponding individual antennas 815, 820, and 825. Although individual communication systems use different frequency bands respectively, when the frequency bands are adjacent to each other, this may cause interference between communication modules. This interference is caused because signals transmitted/received over the corresponding frequency bands cannot be ideally separated from each other. In particular, individual communication modules 800, 805 and 810 and the corresponding antennas 815, 820, and 825 are included in a single UE device, very close to each other, within a short-range. Therefore, the strength of interference between the components is relatively high.

In order to reduce the interference, transmission power between communication modules 800, 805 and 810 needs to be controlled. For example, when the short-range communication module 810, such as Bluetooth, WLAN, etc., attempts to receive data on the LTE uplink, transmission signals of the LTE communication module 800 may cause interference with the short-range communication module 810. In order to decrease the interference, the maximum uplink transmission power of the LTE communication module 800 is restricted, thereby controlling the amount of interference. Alternatively, the operation of the LTE communication module 800 is temporarily stopped, thereby removing the amount of interference power affecting the short-range communication module 810. In contrast, the short-range communication module 810 on the LTE downlink may cause interference with reception signals of the LTE communication module 800. In order to decrease the interference, the maximum downlink transmission power of the short-range communication module 810 is restricted or the operation of the short-range communication module 810 is temporarily stopped, thereby controlling the amount of interference affecting LTE communication module 800.

Figure 9:
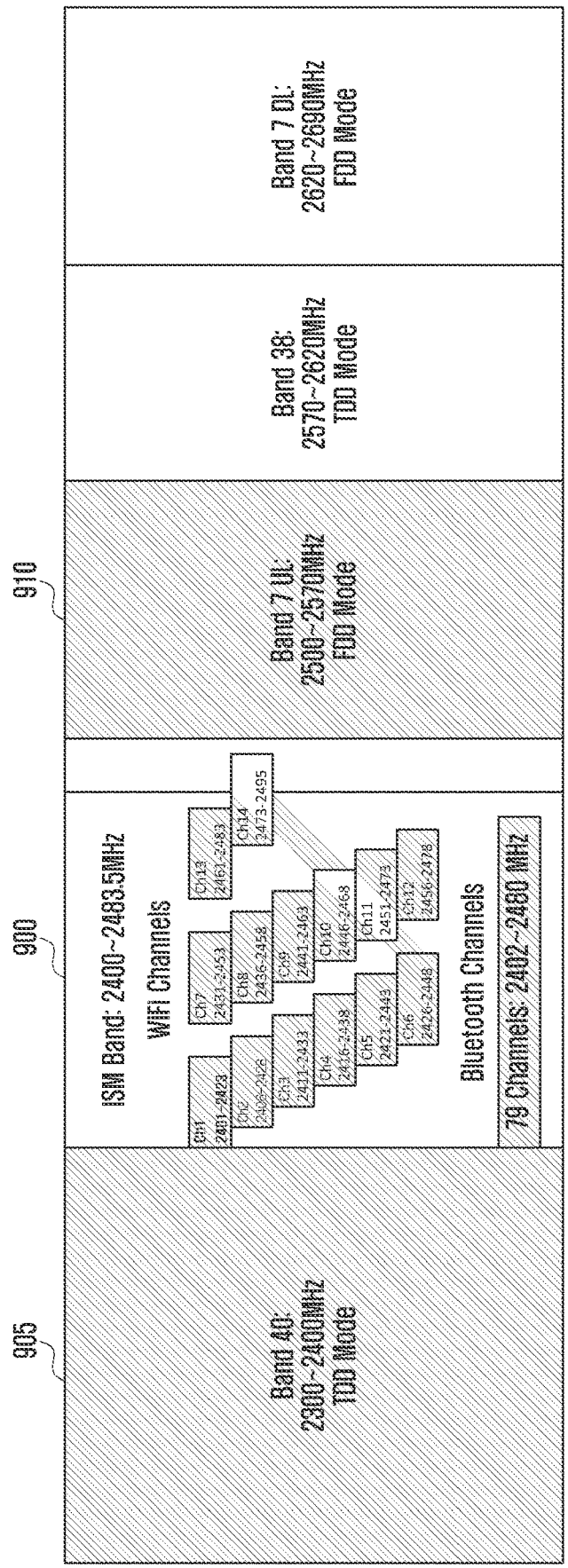
FIG. 9 is a diagram showing a frequency band adjacent to the ISM band, from among the frequency bands that the current 3GPP uses for mobile communication.

FIG. 9 is a diagram showing a frequency band adjacent to the ISM band, from among the frequency bands that the current 3GPP uses for mobile communication.

ISM band (indicated by reference number 900), Band 40 (indicated by reference number 905), and Band 7 (indicated by reference number 910) may have frequency bands adjacent to each other. In a state where a mobile communication cell employs Band 40, when WLAN uses channel 1, Ch1, this causes a serious interference phenomenon. In a state where a mobile communication cell employs Band 7, when WLAN uses channel 13, Ch 13, or channel 14, Ch 14, this also causes a serious interference phenomenon. Therefore, a method is needed to prevent the interference from being caused.

In order to avoid interference between communication modules in UE, the legacy LTE standard has provided a method that adjusts DRX configuration information by TDM and thus reduces IDC interference between modules.

Figure 10:
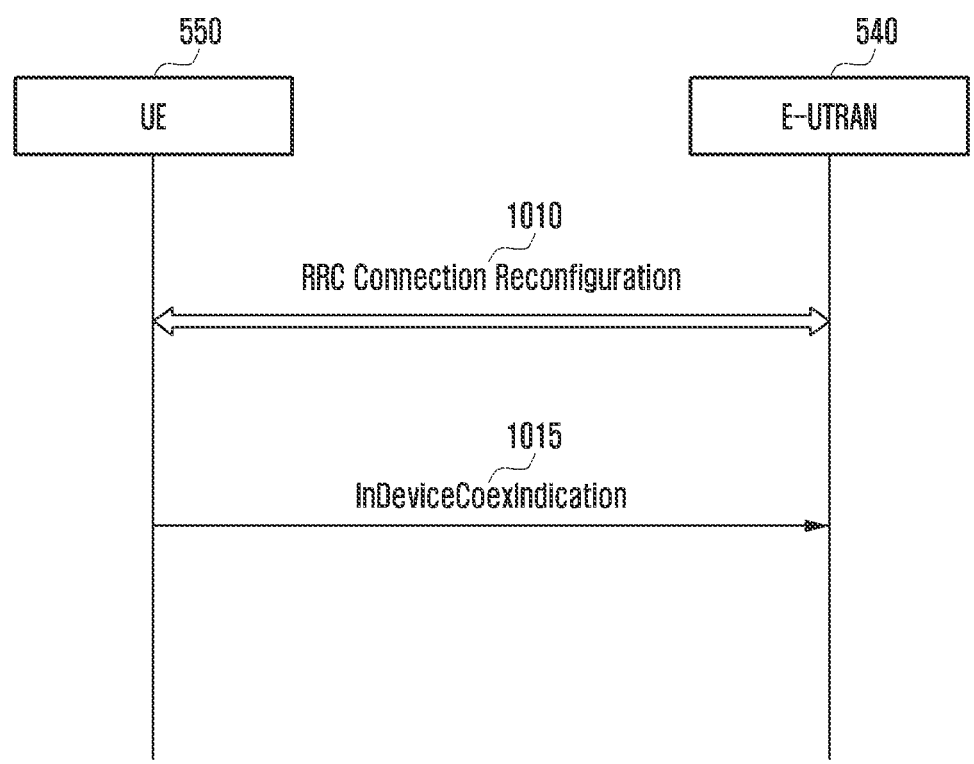
FIG. 10 is a flow diagram that describes a method for UE to provide an eNB with DRX configuration information capable of minimizing IDC interference in the LTE standard.

FIG. 10 is a flow diagram that describes a method for UE to provide an eNB with DRX configuration information capable of minimizing IDC interference in the LTE standard.

With reference to FIG. 10, eNB 540 transmits a message, RRC Connection Reconfiguration, to UE 550 to provide various configuration information, such as cell measurement, DRX, etc. in operation 1010. When UE 550 ascertains that frequencies to be measured according to the instruction from the eNB 540 are affected by IDC interference, it transmits DRX configuration information for minimizing IDC interference to the eNB, using a message, InDeviceCoexIndication, in operation 1015. The DRX configuration information contains a DRX cycle, an offset value indicating a DRX start timing, DRX active time information, etc. Table 4 is DRX configuration information for minimizing IDC interference, defined in the LTE standard TS36.331.

TABLE 4 drx-CycleLength-r11  ENUMERATED  {sf40, sf64, sf80, sf128, sf160,
                                 sf256, spare2, spare1},
drx-Offset-r11                   INTEGER (0..255) OPTIONAL,
drx-ActiveTime-r11  ENUMERATED {sf20, sf30, sf40, sf60, sf80, sf100, spare2, spare1}

In table 4, sf40 represents a unit of 40 sub-frames. drx-Offset represents an offset value indicating a DRX start timing. That is, [(SFN*10)+subframe number] modulo (drx-CycleLength)=drx-Offset is defined. The equation employs 'system frame number (SFN).' SFN is the order number of radio frame and is numbered from 0 up to 1023.

When UE 50 in performing the MDT operation detects that IDC interference occurs, it needs to process MDT measurement information which is being collected. The MDT measurement information collected via the MDT operation will be used for the network optimization. When the collected MDT measurement information is affected by IDC interference, it is preferable that the measurement information is not used for the network optimization. The measurement information is not suitable for representing the service coverage quality because of the interference between communication modules in UE 550. The present invention provides a method of processing MDT measurement information polluted by IDC interference. The present invention also provides a method of inserting an indication notifying that MDT measurement information is affected by IDC interference.

One of the methods of processing MDT measurement information polluted by IDC interference is a method that enables UE 550 to delete the polluted MDT measurement information (option 1). In this case, UE 550 does not report the deleted information to the network. Therefore, the network excludes the polluted information for the network optimization. The method of removing a polluted log enables UE 550 to reduce the amount of MDT data transmitted via a wireless service area and thus decreases signaling overhead, which is advantageous. When the network sets the MDT operation, UE 550 in an idle mode periodically collects and records MDT measurement information. MDT measurement information recorded every cycle is called a log. UE 550 reports a set of logs to the network. It is the easiest for the UE 550 to remove a log polluted by IDC interference, from among the collected logs.

The following table 5 describes MDT measurement information (MDT measurement information in a UEInformationResponse message) that UE 550 that has performed the MDT operation reports to the network using a message, UEInformationResponse. LogMeasInfo IE is referred as logs described above. The set of logs is reported to the network. The LogMeasInfo contains a timestamp value recorded every log and may optionally contain location information. The LogMeasInfo may also contain collected cell IDs, information regarding the received signal strength of a serving cell, and information regarding the received signal strength of neighboring cells according to RAT/frequencies.

TABLE 5

```
LogMeasInfoList-r10   ::=            SEQUENCE (SIZE (1..maxLogMeasReport-r10)) OF
                                         LogMeasInfo-r10
LogMeasInfo-r10 ::=                  SEQUENCE {
    locationInfo-r10                     LocationInfo-r10  OPTIONAL,
    relativeTimeStamp-r10                INTEGER (0..7200),
    servCellIdentity-r10                 CellGlobalIdEUTRA,
    measResultServCell-r10               SEQUENCE {
        rsrpResult-r10                       RSRP-Range,
        rsrqResult-r10                       RSRQ-Range
    },
    measResultNeighCells-r10         SEQUENCE {
        measResultListEUTRA-r10              MeasResultList2EUTRA-r9       OPTIONAL,
        measResultListUTRA-r10               MeasResultList2UTRA-r9        OPTIONAL,
        measResultListGERAN-r10              MeasResultList2GERAN-r10      OPTIONAL,
        measResultListCDMA2000-r10           MeasResultList2CDMA2000-r9    OPTIONAL
    } OPTIONAL,
    ...,
    [[measResultListEUTRA-v1090          MeasResultList2EUTRA-v9e0     OPTIONAL
    ]],
    [[  measResultListMBSFN-r12          MeasResultListMBSFN-r12   OPTIONAL,
    measResultServCell-v1250             RSRQ-Range-v1250              OPTIONAL,
    servCellRSRQ-Type-r12                RSRQ-Type-r12                 OPTIONAL,
    measResultListEUTRA-v1250            MeasResultList2EUTRA-v1250    OPTIONAL
    ]]
}
```

IDC interference does not always affect all the frequency bands. For example, as shown in FIG. 9, LTE bands 905 and 910 adjacent to an ISM band 900 may be affected by interference. Therefore, although IDC interference occurs, only part of the information recorded in the log is highly likely to be affected by the interference. When all the polluted logs are deleted, this may cause to delete measurement information regarding other frequencies which have been affected by interference, which is disadvantageous. In this case, the network does not use the deleted information for the network optimization.

Another method of processing MDT measurement information polluted by IDC interference is to enable UE 550 to delete MDT measurement information corresponding to a frequency polluted during the log (option 2). For example, the MeasResultlistEUTRA IE described in the table 5 contains measurement information regarding neighboring cells according to frequencies. It is assumed that frequencies, F1, F2, and F3, are employed. When frequency F2 is affected by IDC interference, the UE 550 may remove measurement information regarding a neighboring cell corresponding to frequency F2. When measurement information affected by interference in the log is only removed, the network may use the remaining information which has not been affected by interference, which is advantageous.

In order to optimize a service provider network, option 1 and option 2 described above may need information regarding a condition as to whether MDT measurement is actually performed or whether MDT measurement information affected by IDC interference is removed. When a service provider has not recognized information regarding the condition, the service provider cannot detect causes that measurement information has not been recorded, e.g., no actual cell, presence of errors, removal by UE 550 due to IDC interference, or the like. The network optimization may significantly vary according to the types of causes. For example, although UE 550 actually removed measurement information due to IDC interference, the network may ascertain that the UE has not detected a cell signal, i.e., UE is in a gap service area. In addition, the information as to whether MDT measurement is actually performed or whether MDT measurement information affected by IDC interference is removed may be indicated by different methods according to options. The present invention provides a method for UE 550 to effectively indicate information regarding a condition as to whether measurement is affected by IDC interference.

Figure 11:
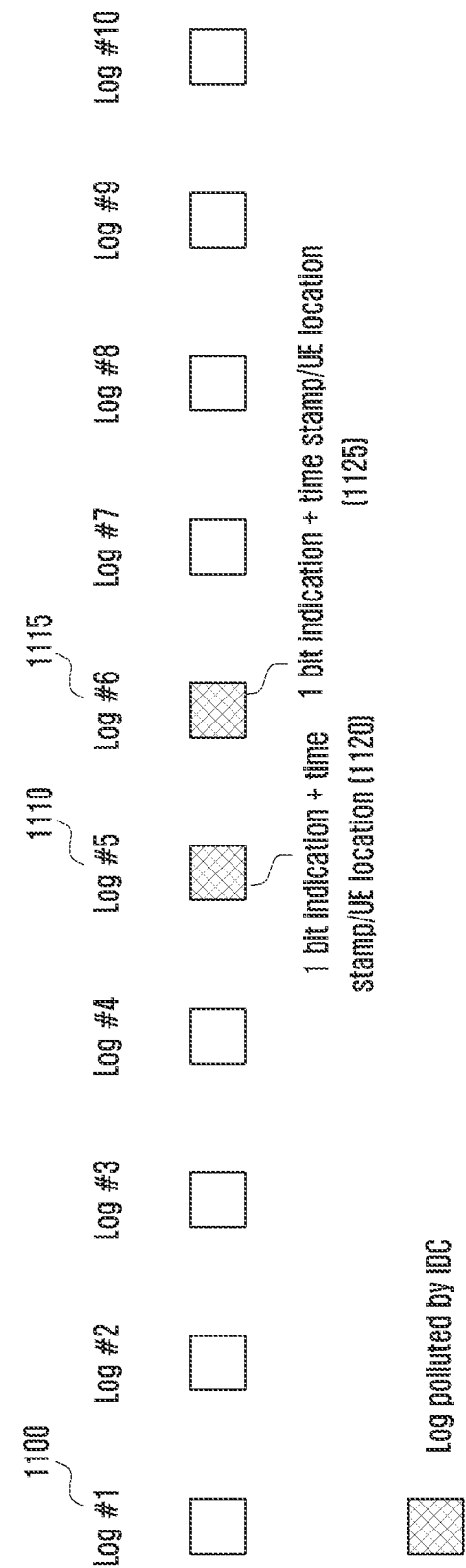
FIG. 11 is a diagram that describes a method of configuring information regarding a condition as to whether MDT measurement information is removed due to IDC interference, based on option 1 according to an embodiment of the present invention.

FIG. 11 is a diagram that describes a method of configuring information regarding a condition as to whether MDT measurement information is removed due to IDC interference, based on option 1 according to an embodiment of the present invention.

With reference to FIG. 11, option 1 does not delete a log itself but includes a 1-bit indication in a log. When logs are deleted, the network may make a mistake as if logs have been removed due to errors or UE 550 in an idle mode temporarily stops the MDT operation in an idle mode because it changes the idle mode to a connection mode. Therefore, option 1 is capable of reducing the signaling overhead which is advantageous and informing the network whether the MDT measurement information is removed due to the IDC interference, by using the least bit. For example, UE in an idle mode periodically creates a log 1000. When IDC interference occurs, this affects specified logs 1110 and 1115. In this case, UE 550 includes the 1-bit indications 1120 and 1125 in the logs 1110 and 1115 where IDC interference occurred. In addition, UE 550 may also include timestamp information and location information in the logs 1110 and 1115 where IDC interference occurred, along with the 1-bit indications 1120 and 1125.

Figure 12:
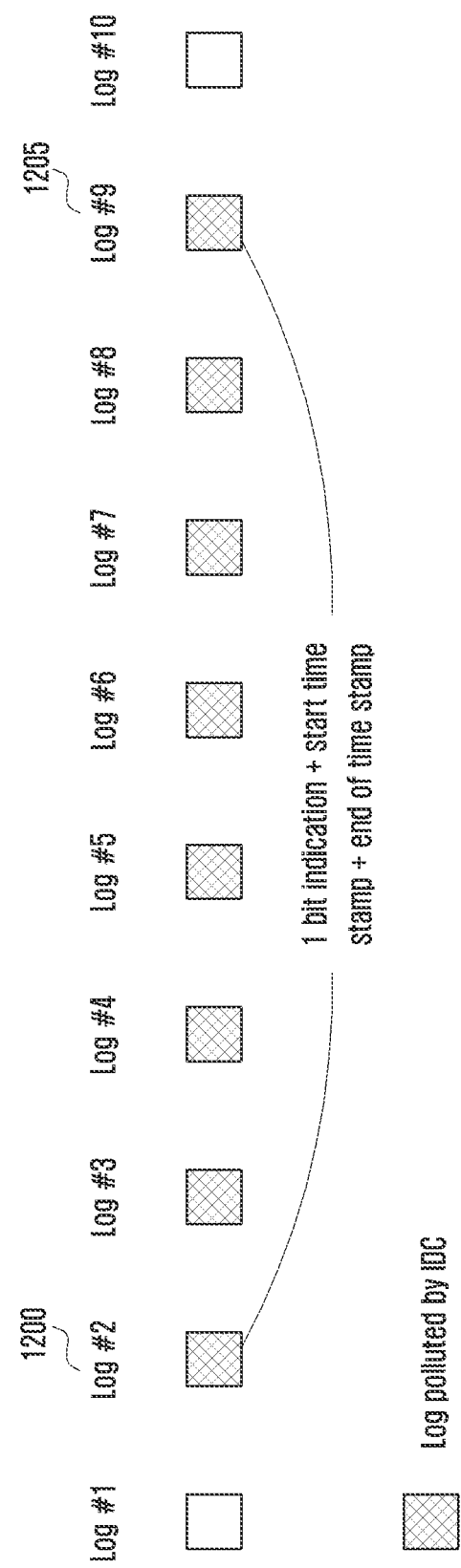
FIG. 12 is a diagram that describes another method of configuring information regarding a condition as to whether MDT measurement information is removed due to IDC interference, based on option 1 according to an embodiment of the present invention.

FIG. 12 is a diagram that describes another method of configuring information regarding a condition as to whether MDT measurement information is removed due to IDC interference, based on option 1 according to an embodiment of the present invention.

With reference to FIG. 12, in order to reduce the signaling overhead, the method includes a 1-bit indication, timestamp, and location information in the least log 1200 and the last log 1205, affected by IDC interference. Although IDC interference is actually released or continuously occurs, when UE 550 in performing the idle mode MDT changes the current mode to a connection mode, the last log 1205 is employed.

When option 2 performs only the addition of a 1-bit indication like option 1, it cannot notify a network of a frequency that measurement information removed by IDC interference corresponds to. The present invention provides a method that adds a list of frequencies, to which measurement information removed due to IDC interference corresponds, to a corresponding log. For example, a frequency list IE may be created according to RATs as in the following table 6. As described in the following table 6, EUTRA frequency indicates a list of frequencies affected by IDC interference. Alternatively, according to another embodiment, a common frequency list IE, not RAT, may be created, and a RAT in the list may be indicated.

TABLE 6

RemoveResultListEUTRA ::= SEQUENCE (SIZE (1..maxCellReport)) OF RemoveResultEUTRA Wireless communication systems have evolved in terms of software or hardware to provide high quality communication service. For example, a communication technology has been developed to employ a number of antennas. A technology for efficiently restoring data from physical signals has made progress.

In order to meet the increasing demand in large communication capacity, a number of technologies have been proposed, e.g., a method of providing a number of connections. In LTE systems, a carrier aggregation (CA) technique provides a number of connections using a number of carriers, so that users can receive various services via a number of resources.

An embodiment of the present invention provides an encryption method using an LTE eNB assisted WLAN authentication scheme in an LTE-WLAN aggregation (LWA) technology. More specifically, although an LTE eNB encryption key has been changed when the LTE eNB handover is performed, UE uses the encryption key of a WLAN AP. When UE connects or reconnects to a different WLAN AP or the same WLAN AP, the UE performs the authentication based on the encryption key of the LTE eNB to which the UE is handed over.

In the following description, terms used to identify an access node, terms referred to as network entities, terms expressing messages, terms representing interfaces between network objects, terms used for various types of identification information, etc. are used for the sake of convenient description. Therefore, the present invention is not limited by the terms and may use other terms with the meanings equivalent to the terms described in the present disclosure, representing the corresponding components.

For the sake of convenient description, the present disclosure uses terms and names defined in the specifications of the 3rd generation partnership project long term evolution (3GPP LTE) and institute of electrical and electronic engineers (IEEE) 802.11. However, it should be understood that the present invention is not limited to the terms and names and may also be applied to systems following the other standards.

The following description explains embodiments of the present invention that provide the dual connectivity using a wireless local area network (WLAN) technology in cellular communication systems. However, it should be understood that the present invention may also be applied to a radio access technology (RAT).

Figure 13:
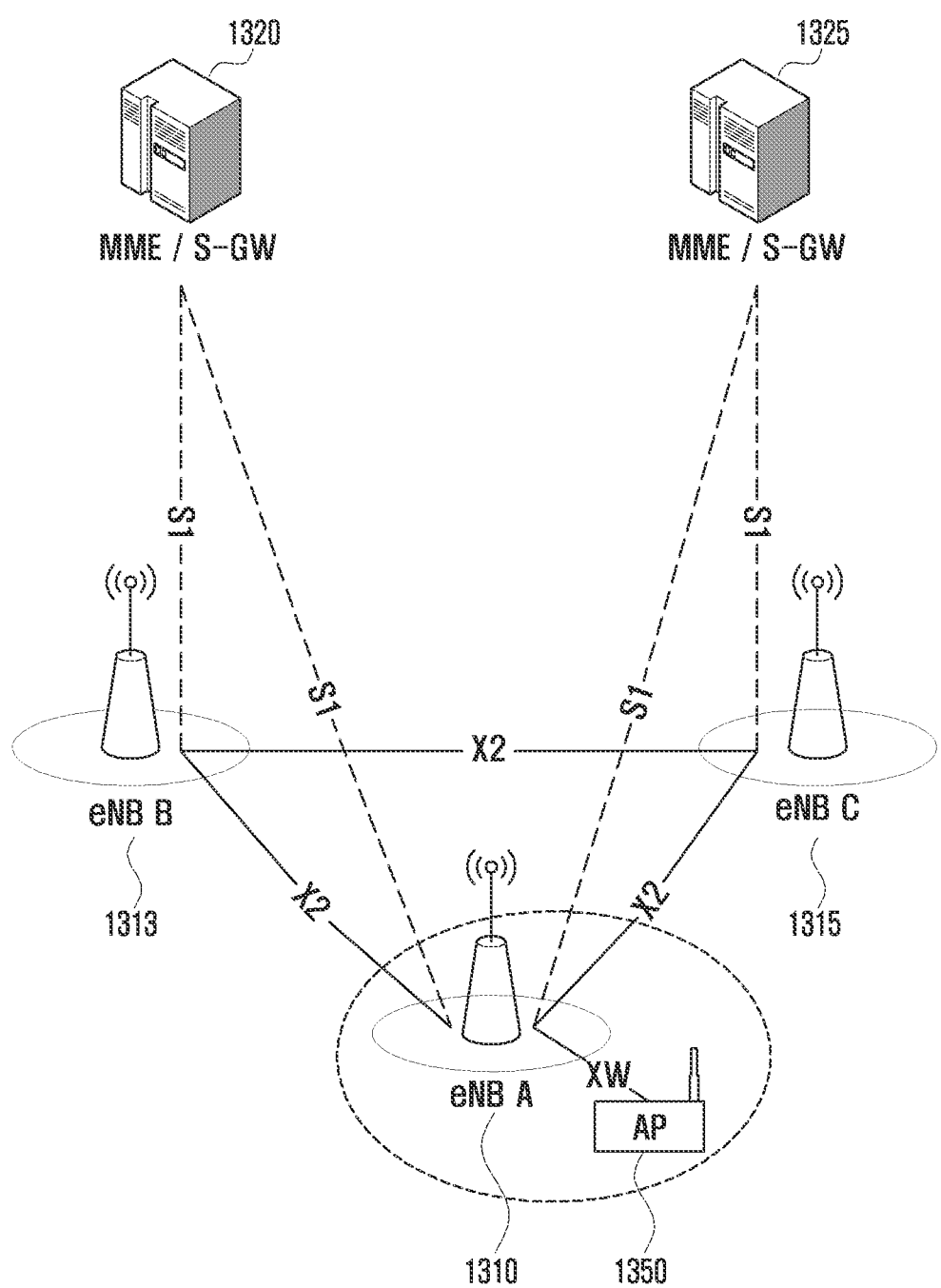
FIG. 13 is a diagram showing the network configuration of a wireless communication system according to an embodiment of the present invention.

FIG. 13 is a diagram showing the network configuration of a wireless communication system according to an embodiment of the present invention.

With reference to FIG. 13, the wireless communication system includes eNB A (1310), eNB B (1313), eNB C (1315), mobility management entities (MMEs)/serving-gateways (S-GWs) 1320 and 1325, and access point (AP) 1350. Although the embodiment is described based on three eNBs 1310, 1313 and 1315, it should be understood that the embodiment may also be modified in such a way as to include two eNBs or four or more eNBs. The MMEs/S-GWs 1320 and 1325 may be separated into MMEs and S-GWs.

The eNBs 1310, 1313 and 1315 are referred to as access nodes of a cellular network and provide wireless access to UE devices (not shown) to connect to the network. That is, the eNBs 1310, 1313 and 1315 support connection between a core network and the UE devices. According to various embodiments of the present invention, the eNB A (1310) provides the UE with the dual connectivity via the AP 1350.

The MMEs/S-GWs 1320 and 1325 manage the mobility of UE. The MMEs/S-GWs 1320 and 1325 may also perform the authentication for UE to connect to a network, bearer management, etc. The MMEs/S-GWs 1320 and 1325 processes packets transmitted from the eNBs 1310, 1313 and 1315 or packets to be forwarded to the eNBs 1310, 1313 and 1315.

The AP 1350 is an access node of a WLAN and provides wireless access to UE devices. In particular, according to various embodiments of the present invention, the AP 1350 is capable of providing UE with the WLAN-based connection for dual connectivity, according to the control of the eNB A (1310). According to an embodiment of the present invention, the AP 1350 may be included in the eNB A (1310) or may be connected to the eNB A (1310) via a separate interface. In this case, the eNB A (1310) is capable of transmitting: part of the downlink data to the UE; or the other of the downlink data to the UE via the AP 1350. The UE is capable of transmitting: part of the uplink data to the eNB A (1310); and the other of the uplink data to the AP 1350.

UE is capable of connecting to a cellular network via the eNB A (1310). According to an embodiment of the present invention, the eNB A (1310) additionally sets the UE to connect to the AP 1350, thereby enabling the UE to make a communication on a broader band. Although a core network entity (e.g., MME, S-GW, packet data network gateway (P-GW), etc.) does not recognize that dual connectivity has been set by additionally using the AP 1350 in a wireless area, it may provide services. In this case, the dual connectivity is called LTE-WLAN aggregation (or carrier aggregation (CA) or integration).

When the entity provides the dual connectivity via the AP 1530, a connection to transmit data needs to be determined. For example, in the case of downlink, the eNB A (1310) receives data from a core network and determines whether it will transmit the data directly or via a WLAN. In the case of uplink, the UE determines a path to transmit data and transmits the data to the core network.

Figure 14:
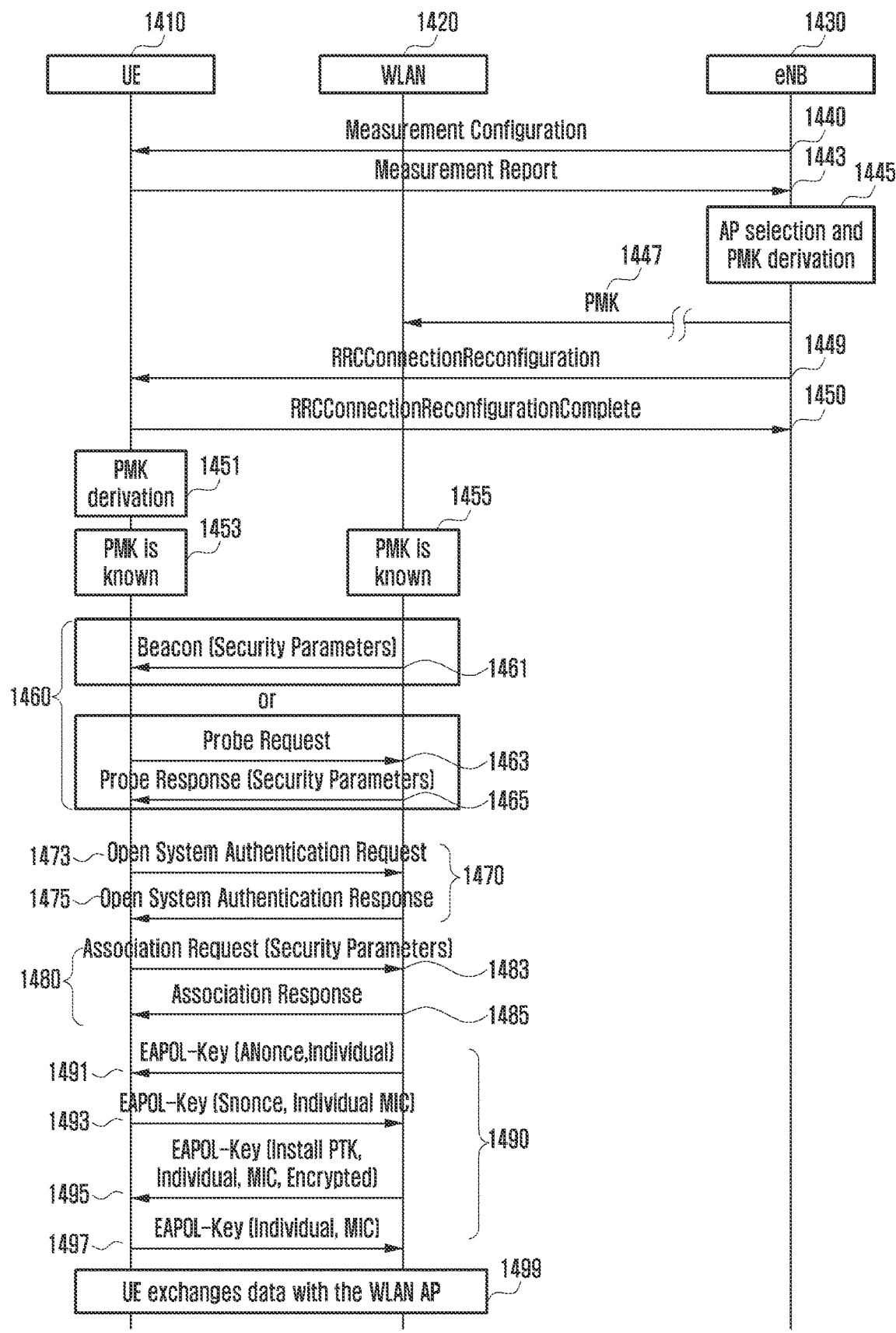
FIG. 14 is a flow diagram that describes a message flow between UE and an eNB, based on an LTE eNB assisted-WLAN authentication scheme, when employing an LTE-WLAN integration technology.

FIG. 14 is a flow diagram that describes a message flow between UE and an eNB, based on an LTE eNB assisted-WLAN authentication scheme, when employing an LTE-WLAN integration technology.

With reference to FIG. 14, the eNB 1430 transmits, to UE 1410, a measurement configuration instructing the UE 1410 to measure its neighboring WLAN in operation 1440. After receiving the measurement configuration, UE 1410 discovers a WLAN to meet the condition according to the measurement configuration information and reports the discovery result (measurement report) to the eNB 1430 in operation 1443. The eNB 1410 selects one WLAN AP 1420 from the WLAN APs contained in the received report result (AP selection) and creates a shared encryption key to be used for the WLAN authentication in operation 1445. The eNB 1430 transmits the created key to the selected WLAN AP 1420 in operation 1447. The encryption key created in operation 1445 is called a pairwise master key (PMK). The eNB 1430 is capable of creating the PMK using its encryption key (e.g., an encryption key KeNB of the eNB 1430 or KUPenc, KRRCenc, KRRCint, etc., derived from the encryption key KeNB).

The eNB 1430 transmits, to the UE 1410, configuration information, RRCConnectionReconfiguration, enabling the UE 1410 to use the selected WLAN AP 1420 in operation 1449. The UE 1410 transmits, to the eNB 1430, a message acknowledging, RRCConnectionReconfigurationComplete, that it has successfully received the configuration information in operation 1450.

Since UE 1410 has already stored the encryption key KeNB of the eNB 1430 or KUPenc, KRRCenc, and KRRCint derived from the KeNB, it creates a PMK the same way as the eNB 1430 in operation 1451. Therefore, the UE 1410 and the WLAN AP 1420 have the same PMK as in operations 1453 and 1455.

After that, UE 1410 performs the following procedure.

Step 1 (1460): The UE 1410 discovers the WLAN security policy based on the detection of Beacon frames or Probe Response frames. That is, the UE 1410 is capable of receiving beacon frames containing WLAN security parameters from the WLAN AP 1420 in operation 1461. The UE 1410 is capable of transmitting a Probe request message to the WLAN AP 1420 in operation 1463. The UE 1410 is capable of receiving the Probe response message containing LAN security parameters from the WLAN AP 1420 in operation 1465.

Step 2 (1470): After the discovery of step 1 (1460), the UE 1410 performs open system authentication. That is, the UE 1410 transmits an open system authentication request message to the WLAN AP 1420 in operation 1473, and receives the open system authentication response message from the WLAN AP 1420 in operation 1475.

Step 3 (1480): The UE 1410 initiates the association procedure and sends the security policy (parameter) selected by the UE 1410 through an association request frame in operation 1483. The UE 1410 receives the association response message from the WLAN AP 1420 in operation 1485.

Step 4 (1490): The UE 1410 and the WLAN AP 1420 perform the handshake procedure by using a shared key PMK which is derived from, e.g., KeNB from above procedure. That is, the UE 1410 receives EAPOL-Key (ANonce, individual) from the WLAN AP 1420 in operation 1491. The UE 1410 transmits EAPOL-Key (Snonce, individual, MIC) to the WLAN AP 1420 in operation 1493. The UE 1410 receives EAPOL-Key (install PTK, individual, MIC, encrypted) from the WLAN AP 1420 in operation 1495. UE 1410 transmits EAPOL-Key (individual, MIC) to the WLAN AP 1420 in operation 1497.

When the UE 1410 succeeds in the authentication based on the procedure, it is capable of exchanging data with the WLAN 1420 in operation 1410. In this case, the traffic is encrypted and transmitted, using a key encryption key (KEK), created from a pairwise transient key (PTK) created from the PMK.

Figure 15:
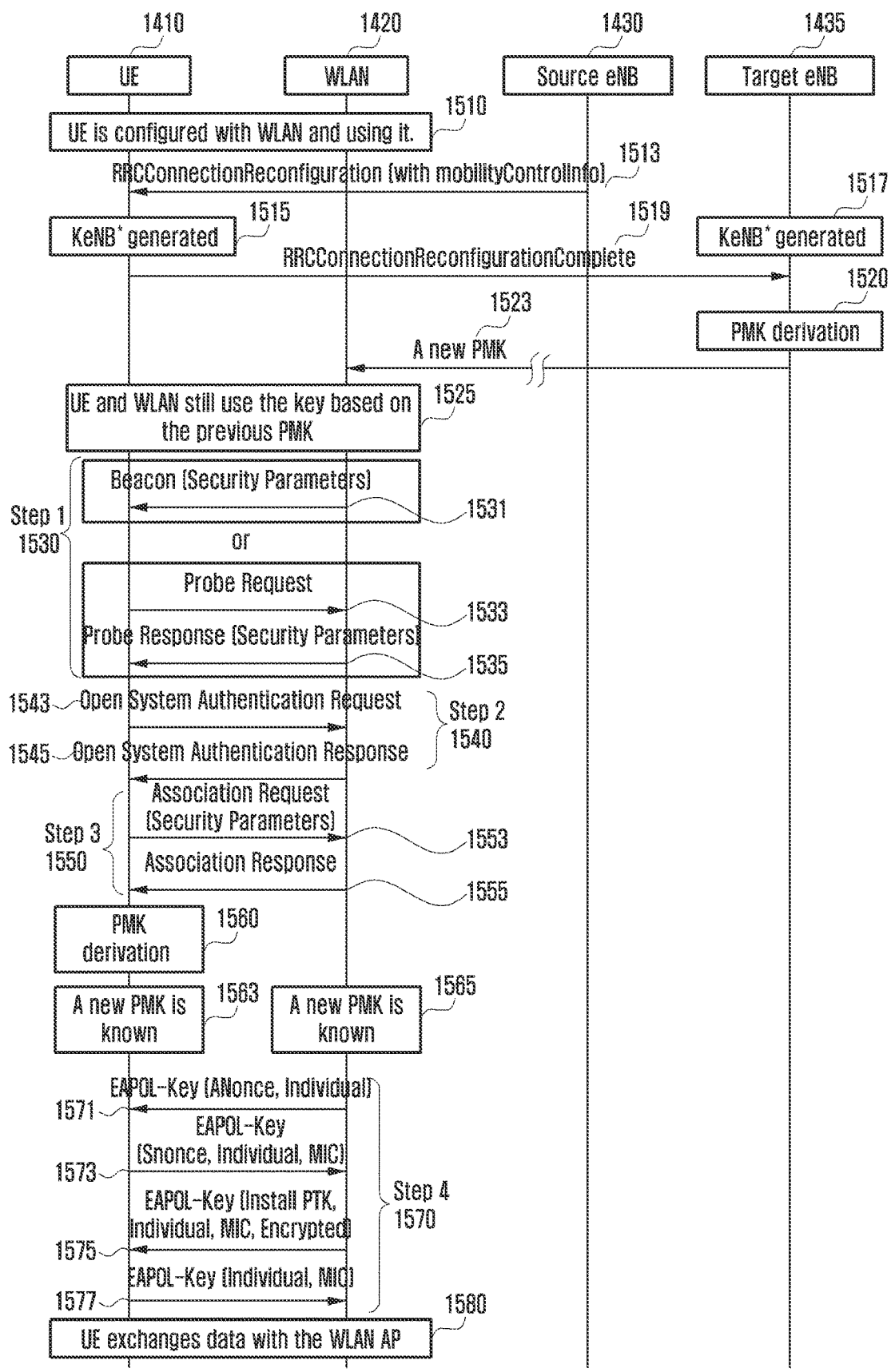
FIG. 15 is a flow diagram that describes a message flow between UE and eNB, when UE performs the LTE eNB handover, using an LTE eNB assisted-WLAN authentication scheme and an LTE-WLAN integration technology.
Figure 16:
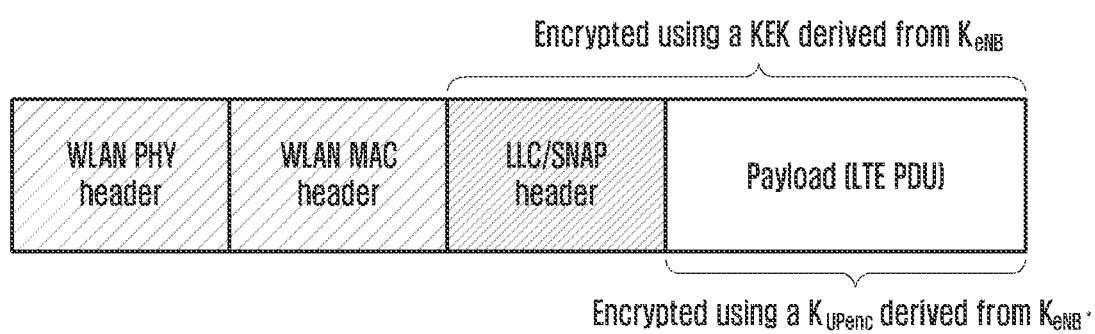
FIG. 16 is a diagram showing an example of an encrypted packet according to an embodiment of the present invention.
Figure 17:
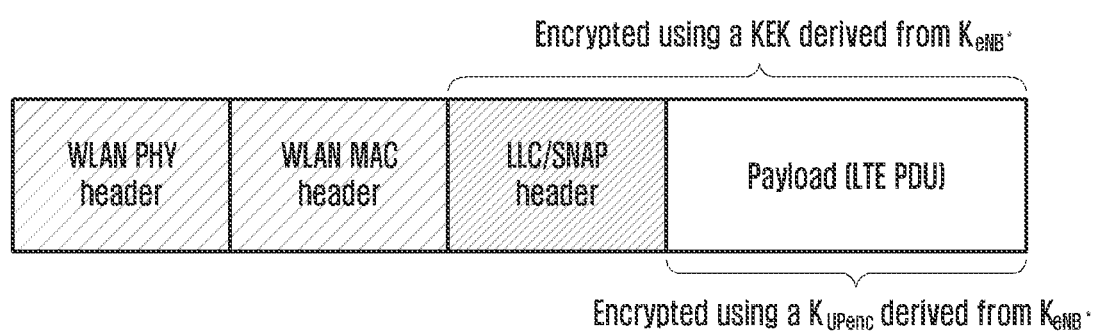
FIG. 17 is a diagram showing another example of an encrypted packet according to an embodiment of the present invention.

FIG. 15 is a flow diagram that describes a message flow between UE and eNB, when UE performs the LTE eNB handover, using an LTE eNB assisted-WLAN authentication scheme and an LTE-WLAN integration technology. FIG. 16 is a diagram showing an example of an encrypted packet according to an embodiment of the present invention. FIG. 17 is a diagram showing another example of an encrypted packet according to an embodiment of the present invention.

With reference to FIG. 15, it is assumed that UE 1410 has already additionally configured with a WLAN by the eNB 1430 and used the WLAN configuration in operation 1510. This operation 1510 is the same as operation 1499 of the method shown in FIG. 14.

In this case, UE 1410 receives a message (e.g., RRCConnectionReconfiguration with mobilityControlInfo) from the eNB 1430, instructing the mobility to another eNB 1453 in operation 1513. The mobility from one eNB to another is called handover. In this case, the legacy eNB 1430 is called a source eNB and a new eNB 1435 to be handed over is called target eNB. In order to perform handover, UE 1410 and the target eNB 1435 generate an encryption key to use after handover, i.e., KeNB*, in operations 1515 and 1517, respectively. Although it is not shown, the source eNB 1430 may generate an encryption key to use after handover, i.e., KeNB*, and then transmit the generated encryption key KeNB* to the target eNB 1435. After that, UE 1410 transmits, to the target eNB 1435, a message (e.g., RRCConnectionReconfigurationComplete) informing that it has succeeded in the handover in operation 1519.

The target eNB 1435 generates a PMK to be used in the WLAN AP 1420 which has been configured in operation 1520. The target eNB 1435 transmits the generated PMK to the WLAN AP 1420 in operation 1523.

However, despite success of the handover, UE 1410 still makes a communication based on a key (PMK) that it has used, as in operation 1525, which is identical to operation 1510. That is, UE 1410 communicates the WLAN AP 1420 based on the key (PMK) that it has used before the handover of the eNB, without releasing the connection with the WLAN AP 1420 additionally configured in operation 1510.

Therefore, as shown in FIG. 16, LTE packet (e.g., packet of a PDCP layer) that the eNB 1435 transmits to the WLAN AP 1420 is encrypted using a KUPenc, generated from an encryption key KeNB* of a new eNB 1435. The WLAN AP 1420 encrypts the packet by using a KEK generated from an encryption key KeNB of the precious eNB 1430.

After that, UE 1410 may connect to a WLAN AP which is identical to or differs from the previous WLAN AP 1420, due to various causes, such as the mobility of the UE 1410, etc. That is, UE 1410 releases the connection with the legacy WLAN AP 1420 and then connects to the same WLAN AP 1420 or to a new WLAN AP.

In this case, UE 1410 performs the following procedure.

Step 1 (1530): The UE 1410 discovers the WLAN security policy based on detection of Beacon frames or Probe Response frames. That is, the UE 1410 is capable of receiving beacon frames containing WLAN security parameters from the WLAN AP 1420 in operation 1531. The UE 1410 is capable of transmitting a Probe request message to the WLAN AP 1420 in operation 1533. The UE 1410 is capable of receiving the Probe response message containing LAN security parameters from the WLAN AP 1420 in operation 1535.

Step 2 (1540): After the discovery of step 1 (1530), the UE 1410 performs open system authentication. That is, the UE 1410 transmits an open system authentication request message to the WLAN AP 1420 in operation 1543, and receives the open system authentication response message from the WLAN AP 1420 in operation 1545.

Step 3 (1550): The UE 1410 initiates the association procedure and sends the security policy (parameter) selected by the UE 1410 through an association request frame in operation 1553. The UE 1410 receives the association response message from the WLAN AP 1420 in operation 1555.

UE 1410 generates a PMK based on KeNB* generated when performing handover in operation 1560, before step 4 (1570) where the authentication is actually performed. The WLAN AP 1420 uses the PMK received in operation 1523. Therefore, UE 1410 and the eNB 1435 perform the authentication based on the PMK. The UE 1410 and the WLAN AP 1420 have the same new PMK as in operations 1563 and 1565.

Step 4 (1570): The UE 1410 and the WLAN AP 1420 perform the handshake procedure by using a shared key PMK. That is, the UE 1410 receives EAPOL-Key (ANonce, individual) from the WLAN AP 1420 in operation 1571. The UE 1410 transmits EAPOL-Key (Snonce, individual, MIC) to the WLAN AP 1420 in operation 1573. The UE 1410 receives EAPOL-Key (install PTK, individual, MIC, encrypted) from the WLAN AP 1420 in operation 1575. UE 1410 transmits EAPOL-Key (individual, MIC) to the WLAN AP 1420 in operation 1577.

When the UE 1410 succeeds in the authentication based on the procedure, it is capable of exchanging data with the WLAN AP 1420 in operation 1580. In this case, the traffic is encrypted and transmitted, using a key encryption key (KEK), created from a pairwise transient key (PTK) created from the PMK. That is, when UE 1410 has performed the connection or reconnection to the WLAN AP 1420 after performing the LTE eNB handover, LTE packet (e.g., packet of a PDCP layer) that the eNB 1435 transmits to the WLAN AP 1420 is encrypted using a KUPenc, generated from an encryption key KeNB* of a new eNB 1435 as shown in FIG. 17. The WLAN AP 1420 encrypts the packet by using a KEK generated from an encryption key KeNB* of the new eNB 1435.

Therefore, according to an embodiment of the present invention, although an LTE eNB encryption key has been changed when an LTE eNB handover is performed, UE uses the encryption key of a WLAN AP. When UE connects or reconnects to a different WLAN AP or the same WLAN AP, the UE performs the authentication based on the encryption key of the LTE eNB to which the UE is handed over.

Figure 18:
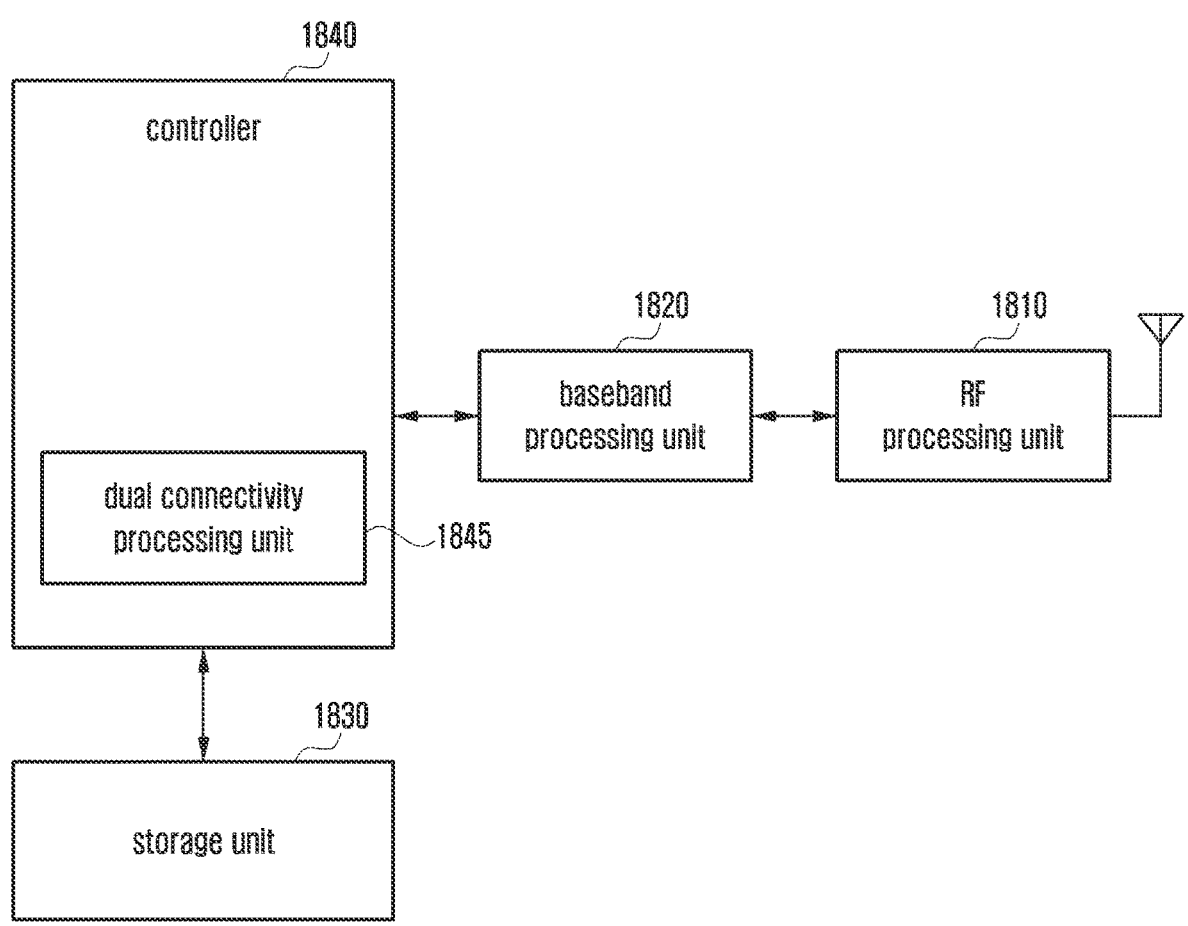
FIG. 18 is a block diagram showing the configuration of UE according to an embodiment of the present invention.

FIG. 18 is a block diagram showing the configuration of UE according to an embodiment of the present invention.

With reference to FIG. 18, UE includes a transceiver and a controller 1840 for controlling operations of the UE. UE also includes a radio frequency (RF) processing unit 1810, a baseband processing unit 1820, and a storage unit 1830. The transceiver may be implemented in such a way as to include the RF processing unit 1810.

The RF processing unit 1810 performs functions related to the transmission/reception of signals via a wireless channel, e.g., the conversion of frequency band, the amplification, etc. The RF processing unit 1810 up-converts baseband signals output from the baseband processing unit 1820 into RF band signals and transmits the RF signals via an antenna. The RF processing unit 1810 down-converts RF band signals received via the antenna into baseband signals. The RF processing unit 1810 is capable of including a transmission filter, a reception filter, an amplifier, a mixer, an oscillator, a digital to analog convertor (DAC), an analog to digital convertor (ADC), etc. Although the embodiment is shown in FIG. 18 so that the UE includes only one antenna, it should be understood that the UE may be implemented to include a number of antennas. The RF processing unit 1810 may also be implemented to include a number of RF chains. The RF processing unit 1810 is capable of performing a beamforming operation. In order to perform a beamforming function, the RF processing unit 1810 is capable of adjusting the phase and amplitude of individual signals transmitted/received via a number of antennas or antenna elements. The RF processing unit 1810 is capable of performing MIMO. The RF processing unit 1810 is capable of receiving a number of layers in the MIMO.

The baseband processing unit 1820 performs the conversion between baseband signals and bitstream according to a physical layer specification of the system. For example, in the transmission of data, the baseband processing unit 1820 encodes and modulates a transmission bitstream, thereby creating complex symbols. In the reception of data, the baseband processing unit 1820 demodulates and decodes baseband signals output from the RF processing unit 1810, thereby restoring a reception bitstream. For example, in the data transmission according to the orthogonal frequency division multiplexing (OFDM), the baseband processing unit 1820 encodes and modulates a transmission bitstream to create complex symbols, maps the complex symbols to sub-carriers, and configures OFDM symbols through the inverse fast Fourier transform (IFFT) operation and the cyclic prefix (CP) insertion. In the data reception, the baseband processing unit 1820 splits baseband signals output from the RF processing unit 1810 into OFDM symbol units, restores signals mapped to sub-carriers through the fast Fourier transform (FFT) operation, and then restores a reception bitstream through the demodulation and the decoding operation.

The baseband processing unit 1820 and the RF processing unit 1810 perform the transmission and reception of signals as described above. Accordingly, the baseband processing unit 1820 and the RF processing unit 1810 may also be called a transmitter, a receiver, a transceiver, a communication unit, etc. In addition, the baseband processing unit 1820 and/or the RF processing unit 1810 may include a number of communication modules to support wireless access technologies that differ from each other. Alternatively, the baseband processing unit 1820 and/or the RF processing unit 1810 may include different communication modules to process signals of different frequency bands. Examples of the wireless access technologies are: wireless LAN (e.g., IEEE 802.11), a cellular network (e.g., LTE), etc. Examples of the different frequency bands are: super high frequency (SHF) (e.g., 2.5 GHz band, 5 GHz band, etc.), millimeter wave (mmW) (e.g., 60 GHz band), etc.

The storage unit 1830 stores a default program for operating the UE, applications, settings, data, etc. In particular, the storage unit 1830 is capable of storing information related to a second access node which performs wireless communication using a second wireless access technology. The storage unit 1830 provides the stored data according to the request of the controller 1840.

The controller 1840 controls all operations of the UE. For example, the controller 1840 controls the baseband processing unit 1820 and the RF processing unit 1810 to perform the transmission/reception of signals. The controller 1840 controls the storage unit 1840 to store/read data therein/therefrom. To this end, the controller 1840 is capable of including at least one processor. For example, the controller 1840 is capable of including a communication processor (CP) for controlling the communication and an application processor (AP) for controlling higher layers such as applications.

The controller 1840 controls UE to perform the operations and procedures described above in the embodiments of the present invention. According to embodiments of the present invention, the controller 1840 includes a dual connectivity processing unit 1845 for processing a function of a dual connectivity mode.

Figure 19:
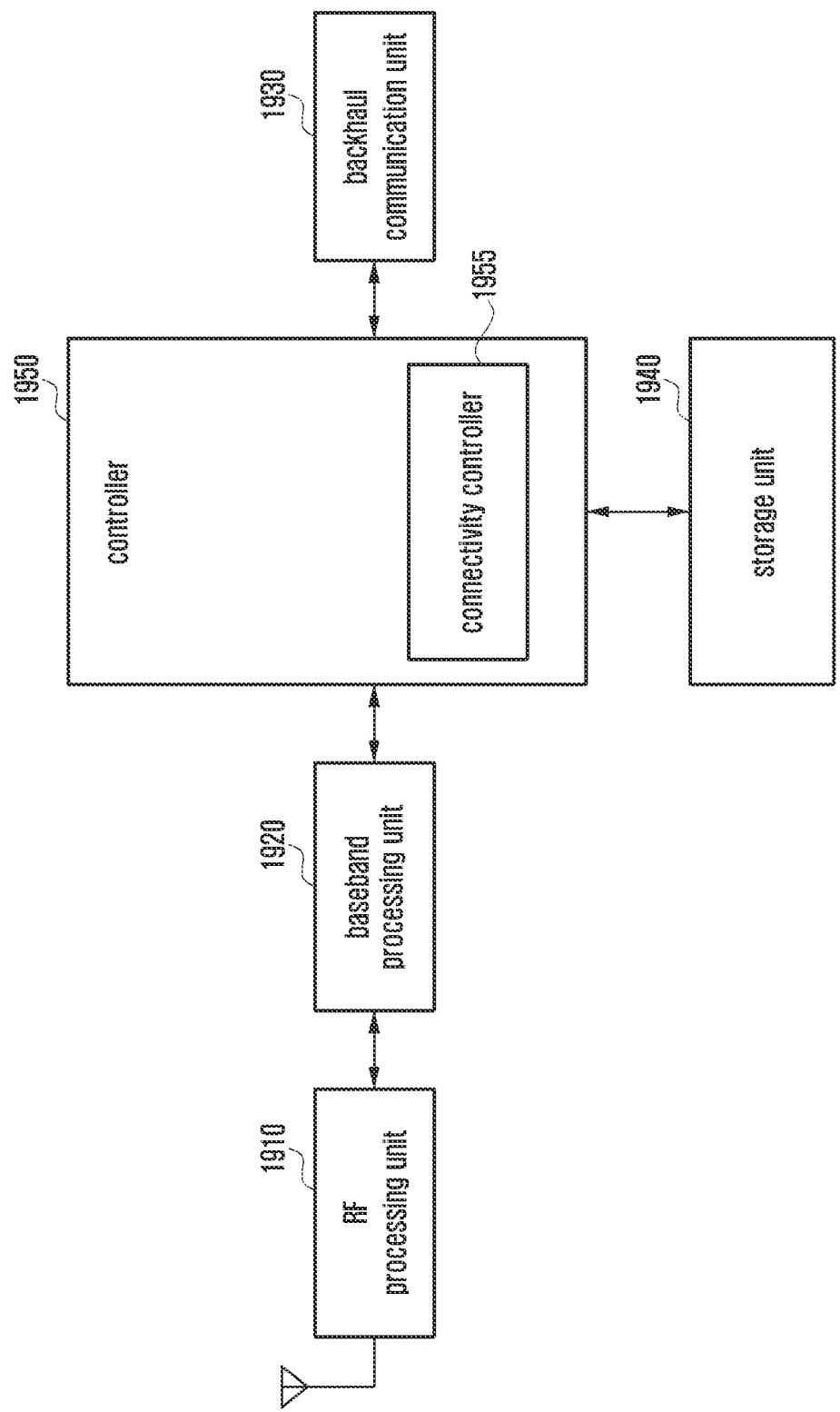
FIG. 19 is a block diagram showing an ENB according to an embodiment of the present invention.

FIG. 19 is a block diagram showing an ENB according to an embodiment of the present invention.

With reference to FIG. 19, the ENB includes a transceiver and a controller 1950 for controlling operations of the eNB. The ENB also includes an RF processing unit 1910, a baseband processing unit 1920, a backhaul communication unit 1930, and a storage unit 1940. The transceiver may be implemented in such a way as to include the RF processing unit 1910.

The RF processing unit 1910 performs functions related to the transmission/reception of signals via a wireless channel, e.g., the conversion of frequency band, the amplification, etc. The RF processing unit 1910 up-converts baseband signals output from the baseband processing unit 1920 into RF band signals and transmits the RF signals via an antenna. The RF processing unit 1910 down-converts RF band signals received via the antenna into baseband signals. The RF processing unit 1910 is capable of including a transmission filter, a reception filter, an amplifier, a mixer, an oscillator, a DAC, an ADC, etc. Although the embodiment is shown in FIG. 19 so that it includes only one antenna, it should be understood that the first access node according to the present invention may be implemented to include a number of antennas. The RF processing unit 1910 may also be implemented to include a number of RF chains. The RF processing unit 1910 is capable of performing a beamforming operation. In order to perform a beamforming function, the RF processing unit 1910 is capable of adjusting the phase and amplitude of individual signals transmitted/received via a number of antennas or antenna elements. The RF processing unit 1910 is capable of transmitting one or more layers, thereby performing the downlink MIMO function.

The baseband processing unit 1920 performs the conversion between baseband signals and bitstream according to a physical layer specification of a first wireless access technology. For example, in the data transmission, the baseband processing unit 1920 encodes and modulates a transmission bitstream, thereby creating complex symbols. In the data reception, the baseband processing unit 1920 demodulates and decodes baseband signals output from the RF processing unit 1910, thereby restoring a reception bitstream. For example, in the data transmission according to the orthogonal frequency division multiplexing (OFDM), the baseband processing unit 1920 encodes and modulates a transmission bitstream to create complex symbols, maps the complex symbols to sub-carriers, and configures OFDM symbols through the inverse fast Fourier transform (IFFT) operation and the cyclic prefix (CP) insertion. In the data reception, the baseband processing unit 1920 splits baseband signals output from the RF processing unit 1910 into OFDM symbol units, restores signals mapped to sub-carriers through the fast Fourier transform (FFT) operation, and then restores a reception bitstream through the demodulation and the decoding operation. The baseband processing unit 1920 and the RF processing unit 1910 perform the transmission and reception of signals as described above. Accordingly, the baseband processing unit 1920 and the RF processing unit 1910 may also be called a transmitter, a receiver, a transceiver, a communication unit, a wireless communication unit, etc.

The backhaul communication unit 1930 provides interfaces to communicate with other nodes in the network. That is, the backhaul communication unit 1930 converts: a bitstream into a physical signal to be transmitted to other nodes of the ENB, e.g., an auxiliary ENB, a core network, etc.; and a physical signal received from the other nodes into a bitstream.

The storage unit 1940 stores a default program for operating the ENB, applications, settings, data, etc. In particular, the storage unit 1940 is capable of storing information regarding a bearer allocated to the connected UE, a measurement result reported from the connected UE, etc. The storage unit 1940 is capable of providing the dual connectivity function to UE or storing information to determine whether to terminate the dual connectivity operation. The storage unit 1940 provides the stored data according to the request of the controller 1950.

The controller 1950 controls all operations of the ENB. To this end, the controller 1950 includes at least one processor. For example, the controller 1950 controls the baseband processing unit 1920, the RF processing unit 1910 and the backhaul communication unit 1930 to perform the transmission/reception of signals. The controller 1950 controls the storage unit 1940 to store/read data therein/therefrom. To this end, the controller 1950 is capable of including at least one processor. The controller 1950 is capable of including a dual connectivity controller 1955 which provides UE with a dual connectivity function.

For example, the controller 1950 is capable of controlling the ENB to perform the functions and procedures related to the embodiments described above.

Figure 20:
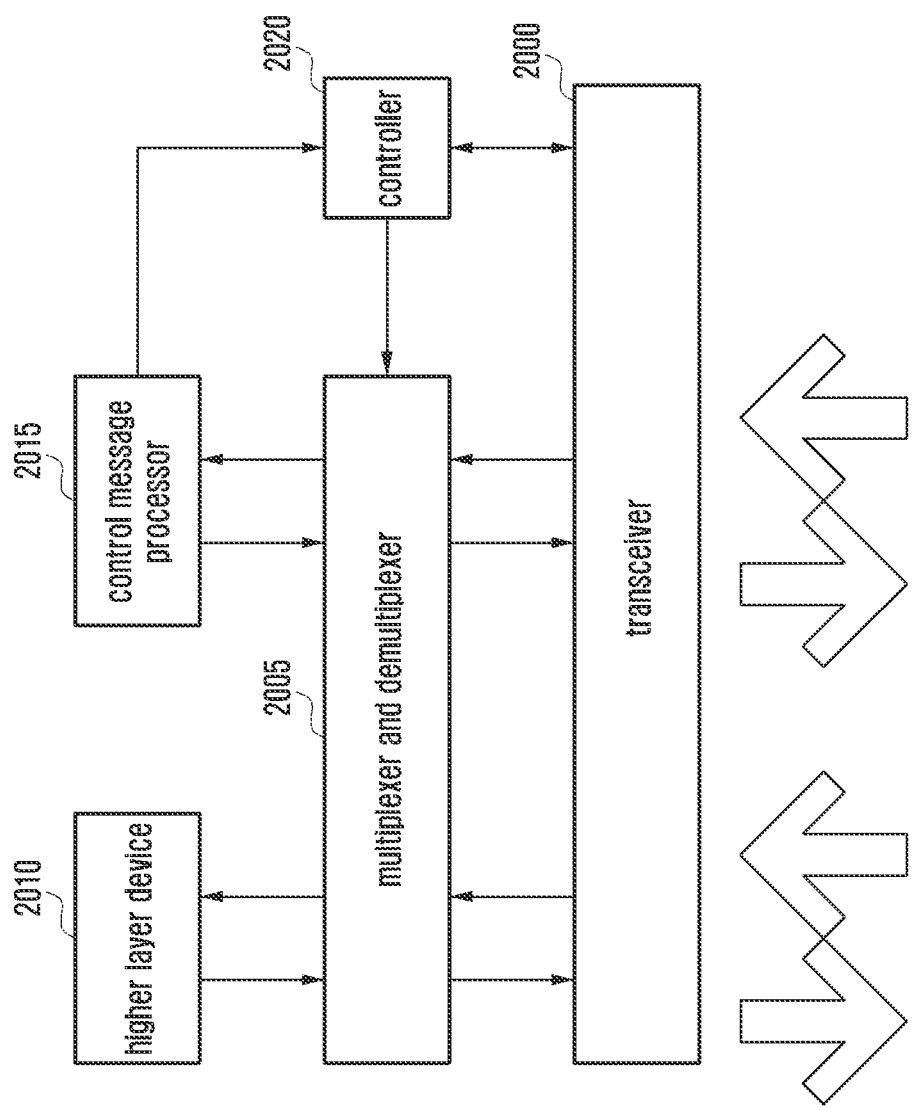
FIG. 20 is a block diagram showing UE according to an embodiment of the present invention.

FIG. 20 is a block diagram showing UE according to an embodiment of the present invention.

With reference to FIG. 20, UE performs the transmission/reception of data, etc., to/from the higher layer device 2010. The UE performs the transmission/reception of control messages via the control message processor 2015. When the UE transmits control signals or data to an ENB, the controller 2020 controls: the multiplexer 2005 to multiplex data; and the transmitter 2000 to transmit the processed data to the ENB. When UE receives signals or data from the ENB, the controller 2020 controls: the receiver 2000 to receive physical signals; and the demultiplexer 2005 to de-multiplex the received signals and to transfer the processed signals to the higher layer 2010 or the control message processor 2015, according to information included in the individual messages.

Figure 21:
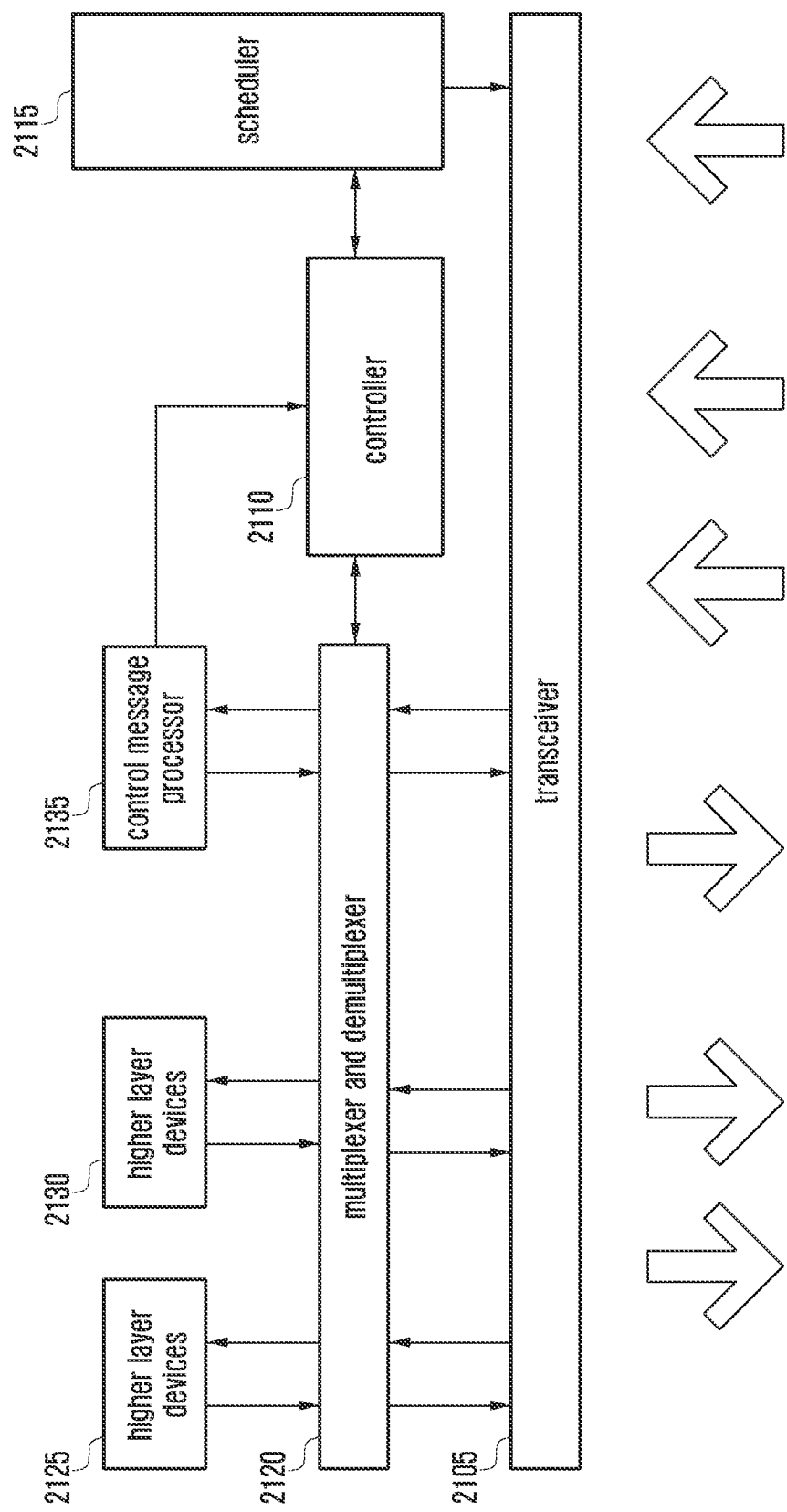
FIG. 21 is a block diagram showing an eNB according to an embodiment of the present invention.

FIG. 21 is a block diagram showing an eNB according to an embodiment of the present invention.

With reference to FIG. 21, the eNB includes a transceiver 2105, a controller 2110, a multiplexer and demultiplexer 2120, a control message processor 2135, higher layer devices 2125 and 2130, and a scheduler 2115.

The transceiver 2105 transmits data and control signals via the forward carriers, and receives data and control signals via the reverse carriers. When a number of carriers are set, the transceiver 2105 transmits and receives data and control signals via the carriers. The multiplexer and demultiplexer 2120: multiplexes data from the control message processor 2135 or the higher layer devices 2125 and 2130; or de-multiplexes data from the transceiver 2105 to transfer the processed data to the control message processor 2135, the higher layer devices 2125 and 2130 or the controller 2110.

The controller 2110 determines whether it applies a band-specific measurement gap to specified UE and also whether it includes the configuration information in a message, RRCConnectionReconfiguration. The control message processor 2135 creates a message, RRCConnectionReconfiguration, to be transmitted to the UE, and transfers the message to the lower layer, according to the control of the controller 2110. The higher layer devices 2125 and 2130 may be configured according to types of services by types of UE. The higher layer devices 2125 and 2130 process data, created from user services such as File Transfer Protocol (FTP) or Voice over Internet Protocol (VoIP) services, and transfer the processed data to the multiplexer and demultiplexer 2120. The higher layer devices 2125 and 2130 process data, from the multiplexer and demultiplexer 2120, and transfer the processed data to the service applications of the higher layers. The scheduler 2115 allocates transmission resources to UE at a proper timing, considering the buffer state, channel state, active time, etc., of the UE. The scheduler 2115 controls the transceiver 2105 to process: a signal transmitted from UE; or a signal to be transmitted to UE.

As described above, according to an embodiment of the present invention, the method enables UE to operate in such a way that the UE is allocated resources but does not perform the transmission since it does have data to be transmitted, thereby using the pre-allocation with efficiency.

According to an embodiment of the present invention, the method processes MDT measurement information polluted by IDC interference during the MDT measurement.

According to an embodiment of the present invention, when wireless communication systems employ an LTE-WLAN aggregation (LWA) technology, although UE performs the handover between LTE eNBs, the procedures of authentication/re-authentication/connection/reconnection to a WLAN may be omitted, and this may reduce the delay. When UE performs the connection or reconnection to a different WLAN AP or the same WLAN AP, the UE performs the authentication based on the encryption key of the LTE eNB to which the UE is handed over, thereby increasing the reliability of communication.

It should be understood that the features and advantages of the present invention are not limited to those in the foregoing description, and the other features and advantages not described above will become more apparent from the foregoing description.

The methods according to embodiments described in the claims or description can be implemented with hardware, software, and a combination thereof.

When the methods are implemented with software, a computer-readable storage media where one or more programs (software modules) are stored is provided. One or more programs stored in the computer-readable storage media are configured for execution by one or more processors in the electronic devices. One or more programs include instructions for enabling the electronic device to execute the methods according to embodiments described in the claims or in the description.

These programs (software modules and software) are stored in: random access memory (RAM), flash memory, non-volatile memory, read only memory (ROM), electrically erasable programmable read only memory (EEPROM), magnetic disc storage device, compact disc-ROM (CD-ROM), digital versatile discs (DVDs) or other types of optical storage device, magnetic cassette, etc. or a combination thereof. In addition, two or more of the same type of memories form a memory block.

In addition, the programs may also be stored in an attachable storage device accessible through a communication network, such as Internet, Intranet, local area network (LAN), wide local area network (WAN), storage area network (SAN) or a combination thereof. This storage device may be connected to the apparatus according to the present invention via external ports. In addition, a separate storage device of a communication network may be connected to the apparatus according to the present invention.

In the embodiments of the present invention, components or elements are expressed in singular or plural form. It should be understood that the terms used in the present disclosure are only used to describe specific embodiments, and are not intended to limit the present disclosure. It should also be understood that singular forms may include plural forms as well unless the context clearly indicates otherwise.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

Embodiments of the present invention are described in the description and drawings using particular terms or words; however, the terms or words are merely provided to assist in a comprehensive understanding of the invention and are not suggestive of limitation. Therefore, one skilled in the art will understand that there may be various modifications, alterations, and equivalents from the embodiments.

The invention claimed is:

1. A method performed by a terminal in a wireless communication system, the method comprising:
   receiving, from a base station, a radio resource control (RRC) message including information configuring to skip an uplink transmission;
   identifying whether an uplink grant exists; and
   identifying whether a medium access control (MAC) protocol data unit (PDU) to be generated does not include uplink data and includes a padding buffer status report (BSR),
   wherein the uplink transmission is skipped based on the information, in case that the uplink grant exists, and in case that the MAC PDU to be generated does not include uplink data and includes the padding BSR.

2. The method of claim 1, wherein the uplink grant is addressed to a cell-radio network temporary identifier (C-RNTI).

3. The method of claim 1, wherein the uplink grant is associated with a configured grant.

4. The method of claim 1, wherein the MAC PDU is not generated, in case that the uplink grant exists, and in case that the MAC PDU to be generated does not include uplink data and includes the Padding BSR.

5. A terminal in a wireless communication system, the terminal comprising:
   a transceiver; and
   a controller configured to:
      receive, from a base station via the transceiver, a radio resource control (RRC) message including information configuring to skip an uplink transmission,
      identify whether an uplink grant exists, and
      identify whether a medium access control (MAC) protocol data unit (PDU) to be generated does not include uplink data and includes a padding buffer status report (BSR),
   wherein the uplink transmission is skipped based on the information, in case that the uplink grant exists, and in case that the MAC PDU to be generated does not include uplink data and includes the padding BSR.

6. The terminal of claim 5, wherein the uplink grant is addressed to a cell-radio network temporary identifier (C-RNTI).

7. The terminal of claim 5, wherein the uplink grant is associated with a configured grant.

8. The terminal of claim 5, wherein the MAC PDU is not generated, in case that the uplink grant exists, and in case that the MAC PDU to be generated does not include uplink data and includes the Padding BSR.

9. A method performed by a base station in a wireless communication system, the method comprising:
   transmitting, to a terminal, a radio resource control (RRC) message including information configuring to skip an uplink transmission,
   wherein the uplink transmission is determined to be skipped based on the information, in case that an uplink grant for the terminal exists, and in case that a medium access control (MAC) protocol data unit (PDU) to be generated for the terminal does not include uplink data and includes a padding buffer status report (BSR).

10. The method of claim 9, wherein the uplink grant is addressed to a cell-radio network temporary identifier (C-RNTI).

11. The method of claim 9, wherein the uplink grant is associated with a configured grant.

12. The method of claim 9, wherein the MAC PDU is not generated, in case that the uplink grant exists, and in case that the MAC PDU to be generated does not include uplink data and includes the padding BSR.

13. A base station in a wireless communication system, the base station comprising:
   a transceiver; and
   a controller configured to:
      transmit, to a terminal, a radio resource control (RRC) message including information configuring to skip an uplink transmission,
   wherein the uplink transmission is determined to be skipped based on the information, in case that an uplink grant for the terminal exists, and in case that a medium access control (MAC) protocol data unit (PDU) to be generated for the terminal does not include uplink data and includes a padding buffer status report (BSR).

14. The base station of claim 13, wherein the uplink grant is addressed to a cell-radio network temporary identifier (C-RNTI).

15. The base station of claim 13, wherein the uplink grant is associated with a configured grant.

16. The base station of claim 13, wherein the MAC PDU is not generated, in case that the uplink grant exists, and in case that the MAC PDU to be generated does not include uplink data and includes the padding BSR.

* * * * *